US011479075B2

(12) United States Patent
Graus et al.

(10) Patent No.: US 11,479,075 B2
(45) Date of Patent: Oct. 25, 2022

(54) ADJUSTABLE VEHICLE SUSPENSION SYSTEM

(71) Applicant: Polaris Industries Inc., Medina, MN (US)

(72) Inventors: Jonathon P. Graus, Stacy, MN (US); Brian D. Krosschell, North Branch, MN (US)

(73) Assignee: Polaris Industries Inc., Medina, MN (US)

(*) Notice: Subject to any disclaimer, the term of this patent is extended or adjusted under 35 U.S.C. 154(b) by 0 days.

(21) Appl. No.: 17/176,110

(22) Filed: Feb. 15, 2021

(65) Prior Publication Data
US 2021/0162833 A1 Jun. 3, 2021

Related U.S. Application Data

(63) Continuation of application No. 16/529,001, filed on Aug. 1, 2019, now Pat. No. 10,987,989, which is a
(Continued)

(51) Int. Cl.
*B60G 17/08* (2006.01)
*B60G 17/015* (2006.01)
(Continued)

(52) U.S. Cl.
CPC .......... *B60G 17/08* (2013.01); *B60G 3/20* (2013.01); *B60G 17/015* (2013.01);
(Continued)

(58) Field of Classification Search
CPC .... B60G 17/08; B60G 3/20; B60G 17/01933; B60G 17/015; B60G 2400/204; B60G 2400/40; B60G 2400/10; B60G 2500/30; B60G 2400/39; B60G 2600/20; B60G 2500/10; B62D 1/046
See application file for complete search history.

(56) References Cited

U.S. PATENT DOCUMENTS 3,623,565 A 11/1971 Ward et al.
3,861,229 A 1/1975 Domaas
(Continued)

FOREIGN PATENT DOCUMENTS

AU 2012323853 A1 5/2014
AU 2015328248 A1 5/2017
(Continued)

OTHER PUBLICATIONS

Office Action issued by the Canadian Intellectual Property Office, dated Jun. 22, 2021, for Canadian Patent Application No. 3,043,481; 3 pages.
(Continued)

*Primary Examiner* — Drew J Brown
(74) *Attorney, Agent, or Firm* — Faegre Drinker Biddle & Reath LLP

(57) ABSTRACT

A damping control system for a vehicle having a suspension located between a plurality of ground engaging members and a vehicle frame includes at least one adjustable shock absorber having an adjustable damping profile and a driver actuatable input. The driver actuatable input may be positioned to be actuatable by the driver in the absence of requiring a removal of either of the hands of the driver from a steering device of the vehicle.

17 Claims, 15 Drawing Sheets

Related U.S. Application Data continuation of application No. 15/618,793, filed on Jun. 9, 2017, now Pat. No. 10,406,884.

(51) Int. Cl.
  *B60G 17/019* (2006.01)
  *B62D 1/04* (2006.01)
  *B60G 3/20* (2006.01)
  *B60G 17/016* (2006.01)
  *B60G 17/06* (2006.01)

(52) U.S. Cl.
  CPC ..... *B60G 17/016* (2013.01); *B60G 17/01933* (2013.01); *B60G 17/06* (2013.01); *B62D 1/046* (2013.01); *B60G 2400/10* (2013.01); *B60G 2400/204* (2013.01); *B60G 2400/39* (2013.01); *B60G 2400/40* (2013.01); *B60G 2500/10* (2013.01); *B60G 2500/30* (2013.01); *B60G 2600/20* (2013.01)

(56) References Cited

U.S. PATENT DOCUMENTS

| | | | |
|---|---|---|---|
| 3,933,213 | A | 1/1976 | Trowbridge |
| 4,340,126 | A | 7/1982 | Larson |
| 4,462,480 | A | 7/1984 | Yasui et al. |
| 4,600,215 | A | 7/1986 | Kuroki et al. |
| 4,722,548 | A | 2/1988 | Hamilton et al. |
| 4,749,210 | A | 6/1988 | Sugasawa |
| 4,779,895 | A | 10/1988 | Rubel |
| 4,805,923 | A | 2/1989 | Soltis |
| 4,809,179 | A | 2/1989 | Klingler et al. |
| 4,819,174 | A | 4/1989 | Furuno et al. |
| 4,827,416 | A | 5/1989 | Kawagoe et al. |
| 4,867,474 | A | 9/1989 | Smith |
| 4,903,983 | A | 2/1990 | Fukushima et al. |
| 4,905,783 | A | 3/1990 | Bober |
| 4,927,170 | A | 5/1990 | Wada |
| 4,930,082 | A | 5/1990 | Harara et al. |
| 4,934,667 | A | 6/1990 | Pees et al. |
| 4,949,262 | A | 8/1990 | Buma et al. |
| 4,949,989 | A | 8/1990 | Kakizaki et al. |
| 5,015,009 | A | 5/1991 | Ohyama et al. |
| 5,024,460 | A | 6/1991 | Hanson et al. |
| 5,029,328 | A | 7/1991 | Kamimura et al. |
| 5,037,128 | A | 8/1991 | Okuyama et al. |
| 5,054,813 | A | 10/1991 | Kakizaki |
| 5,062,657 | A | 11/1991 | Majeed |
| 5,071,157 | A | 12/1991 | Majeed |
| 5,080,392 | A | 1/1992 | Bazergui |
| 5,083,811 | A | 1/1992 | Sato et al. |
| 5,092,624 | A | 3/1992 | Fukuyama et al. |
| 5,096,219 | A | 3/1992 | Hanson et al. |
| 5,113,345 | A | 5/1992 | Mine et al. |
| 5,114,177 | A | 5/1992 | Fukunaga et al. |
| 5,144,559 | A | 9/1992 | Kamimura et al. |
| 5,163,538 | A | 11/1992 | Derr et al. |
| 5,189,615 | A | 2/1993 | Rubel et al. |
| 5,233,530 | A | 8/1993 | Shimada et al. |
| 5,253,728 | A | 10/1993 | Matsuno |
| 5,342,023 | A | 8/1994 | Kuriki et al. |
| 5,350,187 | A | 9/1994 | Shinozaki |
| 5,361,209 | A | 11/1994 | Tsutsumi |
| 5,361,213 | A | 11/1994 | Fujieda et al. |
| 5,366,236 | A | 11/1994 | Kuriki et al. |
| 5,375,872 | A | 12/1994 | Ohtagaki et al. |
| 5,377,107 | A | 12/1994 | Shimizu et al. |
| 5,383,680 | A | 1/1995 | Bock et al. |
| 5,390,121 | A | 2/1995 | Wolfe |
| 5,444,621 | A | 8/1995 | Matsunaga et al. |
| 5,475,593 | A | 12/1995 | Townend |
| 5,475,596 | A | 12/1995 | Henry et al. |
| 5,483,448 | A | 1/1996 | Liubakka et al. |
| 5,510,985 | A | 4/1996 | Yamaoka et al. |
| 5,515,273 | A | 5/1996 | Sasaki et al. |
| 5,550,739 | A | 8/1996 | Hoffmann et al. |
| 5,586,032 | A | 12/1996 | Kallenbach et al. |
| 5,632,503 | A | 5/1997 | Raad |
| 5,678,847 | A | 10/1997 | Izawa et al. |
| 5,890,870 | A | 4/1999 | Berger et al. |
| 5,897,287 | A | 4/1999 | Berger et al. |
| 5,992,558 | A | 11/1999 | Noro |
| 6,000,702 | A | 12/1999 | Streiter |
| 6,032,752 | A | 3/2000 | Karpik et al. |
| 6,070,681 | A | 6/2000 | Catanzarite et al. |
| 6,076,027 | A | 6/2000 | Raad et al. |
| 6,078,252 | A | 6/2000 | Kulczycki et al. |
| 6,112,866 | A | 9/2000 | Boichot et al. |
| 6,120,399 | A | 9/2000 | Okeson et al. |
| 6,122,568 | A | 9/2000 | Madau et al. |
| 6,124,826 | A | 9/2000 | Garthwaite et al. |
| 6,125,326 | A | 9/2000 | Ohmura et al. |
| 6,125,782 | A | 10/2000 | Takashima et al. |
| 6,154,703 | A | 11/2000 | Nakai et al. |
| 6,155,545 | A | 12/2000 | Noro et al. |
| 6,157,297 | A | 12/2000 | Nakai |
| 6,157,890 | A | 12/2000 | Nakai et al. |
| 6,161,908 | A | 12/2000 | Takayama et al. |
| 6,176,796 | B1 | 1/2001 | Lislegard |
| 6,181,997 | B1 | 1/2001 | Badenoch et al. |
| 6,206,124 | B1 | 3/2001 | Mallette et al. |
| 6,244,398 | B1 | 6/2001 | Girvin et al. |
| 6,249,728 | B1 | 6/2001 | Streiter |
| 6,249,744 | B1 | 6/2001 | Morita |
| 6,290,034 | B1 | 9/2001 | Ichimaru |
| 6,343,248 | B1 | 1/2002 | Rizzotto et al. |
| 6,352,142 | B1 | 3/2002 | Kim |
| 6,370,458 | B1 | 4/2002 | Shal et al. |
| 6,427,115 | B1 | 7/2002 | Sekiyama |
| 6,463,385 | B1 | 10/2002 | Fry |
| 6,476,714 | B2 | 11/2002 | Mizuta |
| 6,483,467 | B2 | 11/2002 | Kushida et al. |
| 6,502,025 | B1 | 12/2002 | Kempen |
| 6,507,778 | B2 | 1/2003 | Koh |
| 6,526,342 | B1 | 2/2003 | Burdock et al. |
| 6,604,034 | B1 | 8/2003 | Speck et al. |
| 6,657,539 | B2 | 12/2003 | Yamamoto et al. |
| 6,684,140 | B2 | 1/2004 | Lu |
| 6,685,174 | B2 | 2/2004 | Behmenburg et al. |
| 6,752,401 | B2 | 6/2004 | Burdock |
| 6,834,736 | B2 | 12/2004 | Kramer et al. |
| 6,839,630 | B2 | 1/2005 | Sakamoto |
| 6,851,679 | B2 | 2/2005 | Downey et al. |
| 6,860,826 | B1 | 3/2005 | Johnson |
| 6,876,924 | B2 | 4/2005 | Morita et al. |
| 6,895,318 | B1 | 5/2005 | Barton et al. |
| 6,895,518 | B2 | 5/2005 | Wingen |
| 6,938,508 | B1 | 9/2005 | Saagge |
| 6,942,050 | B1 | 9/2005 | Honkala et al. |
| 6,945,541 | B2 | 9/2005 | Brown |
| 6,976,689 | B2 | 12/2005 | Hibbert |
| 7,011,174 | B1 | 3/2006 | James |
| 7,032,895 | B2 | 4/2006 | Folchert |
| 7,035,836 | B2 | 4/2006 | Caponetto et al. |
| 7,055,545 | B2 | 6/2006 | Mascari et al. |
| 7,058,490 | B2 | 6/2006 | Kim |
| 7,058,506 | B2 | 6/2006 | Kawase et al. |
| 7,070,012 | B2 | 7/2006 | Fecteau |
| 7,076,351 | B2 | 7/2006 | Hamilton et al. |
| 7,092,808 | B2 | 8/2006 | Lu et al. |
| 7,097,166 | B2 | 8/2006 | Folchert |
| 7,104,352 | B2 | 9/2006 | Weinzierl |
| 7,123,189 | B2 | 10/2006 | Lalik et al. |
| 7,124,865 | B2 | 10/2006 | Turner et al. |
| 7,136,729 | B2 | 11/2006 | Salman et al. |
| 7,140,619 | B2 | 11/2006 | Hrovat et al. |
| 7,168,709 | B2 | 1/2007 | Niwa et al. |
| 7,233,846 | B2 | 6/2007 | Kawauchi et al. |
| 7,234,707 | B2 | 6/2007 | Green et al. |
| 7,270,335 | B2 | 9/2007 | Hio et al. |
| 7,286,919 | B2 | 10/2007 | Nordgren et al. |
| 7,316,288 | B1 | 1/2008 | Bennett et al. |
| 7,322,435 | B2 | 1/2008 | Lillbacka et al. |

(56) References Cited

U.S. PATENT DOCUMENTS

| | | |
|---|---|---|
| 7,359,787 B2 | 4/2008 | Ono et al. |
| 7,386,378 B2 | 6/2008 | Lauwerys et al. |
| 7,401,794 B2 | 7/2008 | Laurent et al. |
| 7,413,196 B2 | 8/2008 | Borowski |
| 7,421,954 B2 | 9/2008 | Bose |
| 7,427,072 B2 | 9/2008 | Brown |
| 7,441,789 B2 | 10/2008 | Geiger et al. |
| 7,454,282 B2 | 11/2008 | Mizuguchi |
| 7,483,775 B2 | 1/2009 | Karaba et al. |
| 7,510,060 B2 | 3/2009 | Izawa et al. |
| 7,526,665 B2 | 4/2009 | Kim et al. |
| 7,529,609 B2 | 5/2009 | Braunberger et al. |
| 7,533,750 B2 | 5/2009 | Simmons et al. |
| 7,533,890 B2 | 5/2009 | Chiao |
| 7,571,039 B2 | 8/2009 | Chen et al. |
| 7,600,762 B2 | 10/2009 | Yasui et al. |
| 7,611,154 B2 | 11/2009 | Delaney |
| 7,630,807 B2 | 12/2009 | Yoshimura et al. |
| 7,641,208 B1 | 1/2010 | Barron et al. |
| 7,644,934 B2 | 1/2010 | Mizuta |
| 7,684,911 B2 | 3/2010 | Seifert et al. |
| 7,707,012 B2 | 4/2010 | Stephens |
| 7,740,256 B2 | 6/2010 | Davis |
| 7,751,959 B2 | 7/2010 | Boon et al. |
| 7,778,741 B2 | 8/2010 | Rao et al. |
| 7,810,818 B2 | 10/2010 | Bushko |
| 7,815,205 B2 | 10/2010 | Barth et al. |
| 7,823,106 B2 | 10/2010 | Baker et al. |
| 7,823,891 B2 | 11/2010 | Bushko et al. |
| 7,862,061 B2 | 1/2011 | Jung |
| 7,885,750 B2 | 2/2011 | Lu |
| 7,899,594 B2 | 3/2011 | Messih et al. |
| 7,912,610 B2 | 3/2011 | Saito et al. |
| 7,926,822 B2 | 4/2011 | Ohletz et al. |
| 7,940,383 B2 | 5/2011 | Noguchi et al. |
| 7,942,427 B2 | 5/2011 | Lloyd |
| 7,950,486 B2 | 5/2011 | Van et al. |
| 7,959,163 B2 | 6/2011 | Beno et al. |
| 7,962,261 B2 | 6/2011 | Bushko et al. |
| 7,963,529 B2 | 6/2011 | Oteman et al. |
| 7,970,512 B2 | 6/2011 | Lu et al. |
| 7,975,794 B2 | 7/2011 | Simmons |
| 7,984,915 B2 | 7/2011 | Post et al. |
| 8,005,596 B2 | 8/2011 | Lu et al. |
| 8,027,775 B2 | 9/2011 | Takenaka et al. |
| 8,032,281 B2 | 10/2011 | Bujak et al. |
| 8,050,818 B2 | 11/2011 | Mizuta |
| 8,050,857 B2 | 11/2011 | Lu et al. |
| 8,056,392 B2 | 11/2011 | Ryan et al. |
| 8,065,054 B2 | 11/2011 | Tarasinski et al. |
| 8,075,002 B1 | 12/2011 | Pionke et al. |
| 8,086,371 B2 | 12/2011 | Furuichi et al. |
| 8,087,676 B2 | 1/2012 | McIntyre |
| 8,095,268 B2 | 1/2012 | Parison et al. |
| 8,108,104 B2 | 1/2012 | Hrovat et al. |
| 8,113,521 B2 | 2/2012 | Lin et al. |
| 8,116,938 B2 | 2/2012 | Itagaki et al. |
| 8,121,757 B2 | 2/2012 | Song et al. |
| 8,170,749 B2 | 5/2012 | Mizuta |
| 8,190,327 B2 | 5/2012 | Poilbout |
| 8,195,361 B2 | 6/2012 | Kajino et al. |
| 8,209,087 B2 | 6/2012 | Haegglund et al. |
| 8,214,106 B2 | 7/2012 | Ghoneim et al. |
| 8,219,262 B2 | 7/2012 | Stiller |
| 8,229,642 B2 | 7/2012 | Post et al. |
| 8,260,496 B2 | 9/2012 | Gagliano |
| 8,271,175 B2 | 9/2012 | Takenaka et al. |
| 8,296,010 B2 | 10/2012 | Hirao et al. |
| 8,308,170 B2 | 11/2012 | Van et al. |
| 8,315,764 B2 | 11/2012 | Chen et al. |
| 8,315,769 B2 | 11/2012 | Braunberger et al. |
| 8,321,088 B2 | 11/2012 | Brown et al. |
| 8,322,497 B2 | 12/2012 | Marjoram et al. |
| 8,352,143 B2 | 1/2013 | Lu et al. |
| 8,355,840 B2 | 1/2013 | Ammon et al. |
| 8,374,748 B2 | 2/2013 | Jolly |
| 8,376,373 B2 | 2/2013 | Conradie |
| 8,396,627 B2 | 3/2013 | Jung et al. |
| 8,417,417 B2 | 4/2013 | Chen et al. |
| 8,424,832 B2 | 4/2013 | Robbins et al. |
| 8,428,839 B2 | 4/2013 | Braunberger et al. |
| 8,434,774 B2 | 5/2013 | Leclerc et al. |
| 8,437,935 B2 | 5/2013 | Braunberger et al. |
| 8,442,720 B2 | 5/2013 | Lu et al. |
| 8,444,161 B2 | 5/2013 | Leclerc et al. |
| 8,447,489 B2 | 5/2013 | Murata et al. |
| 8,457,841 B2 | 6/2013 | Knoll et al. |
| 8,473,157 B2 | 6/2013 | Savaresi et al. |
| 8,517,395 B2 | 8/2013 | Knox et al. |
| 8,532,896 B2 | 9/2013 | Braunberger et al. |
| 8,534,397 B2 | 9/2013 | Grajkowski et al. |
| 8,534,413 B2 | 9/2013 | Nelson et al. |
| 8,548,678 B2 | 10/2013 | Ummethala et al. |
| 8,550,221 B2 | 10/2013 | Paulides et al. |
| 8,571,776 B2 | 10/2013 | Braunberger et al. |
| 8,573,605 B2 | 11/2013 | Di Maria |
| 8,626,388 B2 | 1/2014 | Oikawa |
| 8,626,389 B2 | 1/2014 | Sidlosky |
| 8,641,052 B2 | 2/2014 | Kondo et al. |
| 8,645,024 B2 | 2/2014 | Daniels |
| 8,666,596 B2 | 3/2014 | Arenz |
| 8,672,106 B2 | 3/2014 | Laird et al. |
| 8,672,337 B2 | 3/2014 | Van et al. |
| 8,676,440 B2 | 3/2014 | Watson |
| 8,682,530 B2 | 3/2014 | Nakamura |
| 8,682,550 B2 | 3/2014 | Nelson et al. |
| 8,682,558 B2 | 3/2014 | Braunberger et al. |
| 8,684,887 B2 | 4/2014 | Krosschell |
| 8,700,260 B2 | 4/2014 | Jolly et al. |
| 8,712,599 B1 | 4/2014 | Westpfahl |
| 8,712,639 B2 | 4/2014 | Lu et al. |
| 8,718,872 B2 | 5/2014 | Hirao et al. |
| 8,725,351 B1 | 5/2014 | Selden et al. |
| 8,725,380 B2 | 5/2014 | Braunberger et al. |
| 8,731,774 B2 | 5/2014 | Sung |
| 8,770,594 B2 | 7/2014 | Tominaga et al. |
| 8,827,019 B2 | 9/2014 | Deckard et al. |
| 8,903,617 B2 | 12/2014 | Braunberger et al. |
| 8,954,251 B2 | 2/2015 | Braunberger et al. |
| 8,972,712 B2 | 3/2015 | Braunberger |
| 9,010,768 B2 | 4/2015 | Kinsman et al. |
| 9,027,937 B2 | 5/2015 | Ryan et al. |
| 9,038,791 B2 | 5/2015 | Marking |
| 9,123,249 B2 | 9/2015 | Braunberger et al. |
| 9,151,384 B2 | 10/2015 | Kohler et al. |
| 9,162,573 B2 | 10/2015 | Grajkowski et al. |
| 9,205,717 B2 | 12/2015 | Brady et al. |
| 9,211,924 B2 | 12/2015 | Safranski et al. |
| 9,327,726 B2 | 5/2016 | Braunberger et al. |
| 9,371,002 B2 | 6/2016 | Braunberger |
| 9,381,810 B2 | 7/2016 | Nelson et al. |
| 9,381,902 B2 | 7/2016 | Braunberger et al. |
| 9,428,242 B2 | 8/2016 | Ginther et al. |
| 9,429,235 B2 | 8/2016 | Krosschell et al. |
| 9,527,362 B2 | 12/2016 | Scheuerell et al. |
| 9,643,538 B2 | 5/2017 | Braunberger et al. |
| 9,662,954 B2 | 5/2017 | Scheuerell et al. |
| 9,830,821 B2 | 11/2017 | Braunberger et al. |
| 9,834,184 B2 | 12/2017 | Braunberger |
| 9,834,215 B2 | 12/2017 | Braunberger et al. |
| 9,855,986 B2 | 1/2018 | Braunberger et al. |
| 9,868,385 B2 | 1/2018 | Braunberger |
| 9,878,693 B2 | 1/2018 | Braunberger |
| 9,945,298 B2 | 4/2018 | Braunberger et al. |
| 10,005,335 B2 | 6/2018 | Brady et al. |
| 10,046,694 B2 | 8/2018 | Braunberger et al. |
| 10,086,698 B2 | 10/2018 | Grajkowski et al. |
| 10,154,377 B2 | 12/2018 | Post et al. |
| 10,195,989 B2 | 2/2019 | Braunberger et al. |
| 10,202,159 B2 | 2/2019 | Braunberger et al. |
| 10,220,765 B2 | 3/2019 | Braunberger |
| 10,227,041 B2 | 3/2019 | Braunberger et al. |
| 10,266,164 B2 | 4/2019 | Braunberger |
| 10,384,682 B2 | 8/2019 | Braunberger et al. |

(56) References Cited

U.S. PATENT DOCUMENTS

| | | |
|---|---|---|
| 10,391,989 B2 | 8/2019 | Braunberger |
| 10,406,884 B2 | 9/2019 | Oakden-Graus et al. |
| 10,410,520 B2 | 9/2019 | Braunberger et al. |
| 10,436,125 B2 | 10/2019 | Braunberger et al. |
| 11,110,913 B2 | 9/2021 | Krosschell et al. |
| 11,124,036 B2 | 9/2021 | Brady et al. |
| 11,285,964 B2 | 3/2022 | Norstad |
| 2001/0005803 A1 | 6/2001 | Cochofel et al. |
| 2001/0021887 A1 | 9/2001 | Obradovich et al. |
| 2001/0035166 A1 | 11/2001 | Kerns et al. |
| 2002/0082752 A1 | 6/2002 | Obradovich |
| 2002/0113185 A1 | 8/2002 | Ziegler |
| 2002/0177949 A1 | 11/2002 | Katayama et al. |
| 2003/0036360 A1 | 2/2003 | Russell et al. |
| 2003/0038411 A1 | 2/2003 | Sendrea |
| 2003/0046000 A1 | 3/2003 | Morita et al. |
| 2003/0047994 A1 | 3/2003 | Koh |
| 2003/0125857 A1 | 7/2003 | Madau et al. |
| 2003/0187555 A1 | 10/2003 | Lutz et al. |
| 2003/0200016 A1 | 10/2003 | Spillane et al. |
| 2003/0205867 A1 | 11/2003 | Coelingh et al. |
| 2004/0010383 A1 | 1/2004 | Lu et al. |
| 2004/0024515 A1 | 2/2004 | Troupe et al. |
| 2004/0026880 A1 | 2/2004 | Bundy |
| 2004/0041358 A1 | 3/2004 | Hrovat et al. |
| 2004/0090020 A1 | 5/2004 | Braswell |
| 2004/0094912 A1 | 5/2004 | Niwa et al. |
| 2004/0107591 A1 | 6/2004 | Cuddy |
| 2005/0023789 A1 | 2/2005 | Suzuki et al. |
| 2005/0098964 A1 | 5/2005 | Brown |
| 2005/0131604 A1 | 6/2005 | Lu |
| 2005/0217953 A1 | 10/2005 | Bossard |
| 2005/0267663 A1 | 12/2005 | Naono et al. |
| 2005/0279244 A1 | 12/2005 | Bose |
| 2005/0280219 A1 | 12/2005 | Brown |
| 2006/0017240 A1 | 1/2006 | Laurent et al. |
| 2006/0064223 A1 | 3/2006 | Voss |
| 2006/0229811 A1 | 10/2006 | Herman et al. |
| 2006/0278197 A1 | 12/2006 | Takamatsu et al. |
| 2006/0284387 A1 | 12/2006 | Klees |
| 2007/0050095 A1 | 3/2007 | Nelson et al. |
| 2007/0073461 A1 | 3/2007 | Fielder |
| 2007/0120332 A1 | 5/2007 | Bushko et al. |
| 2007/0126628 A1 | 6/2007 | Lalik et al. |
| 2007/0158920 A1 | 7/2007 | Delaney |
| 2007/0244619 A1 | 10/2007 | Peterson |
| 2007/0255466 A1 | 11/2007 | Chiao |
| 2008/0059034 A1 | 3/2008 | Lu |
| 2008/0119984 A1 | 5/2008 | Hrovat et al. |
| 2008/0172155 A1 | 7/2008 | Takamatsu et al. |
| 2008/0183353 A1 | 7/2008 | Post et al. |
| 2008/0243334 A1 | 10/2008 | Bujak et al. |
| 2008/0243336 A1 | 10/2008 | Fitzgibbons |
| 2008/0275606 A1 | 11/2008 | Tarasinski et al. |
| 2009/0008890 A1 | 1/2009 | Woodford |
| 2009/0037051 A1 | 2/2009 | Shimizu et al. |
| 2009/0093928 A1 | 4/2009 | Getman et al. |
| 2009/0108546 A1 | 4/2009 | Ohletz et al. |
| 2009/0240427 A1 | 9/2009 | Siereveld et al. |
| 2009/0254249 A1 | 10/2009 | Ghoneim et al. |
| 2009/0261542 A1 | 10/2009 | McIntyre |
| 2009/0308682 A1 | 12/2009 | Ripley et al. |
| 2009/0321167 A1 | 12/2009 | Simmons |
| 2010/0017059 A1 | 1/2010 | Lu et al. |
| 2010/0057297 A1 | 3/2010 | Itagaki et al. |
| 2010/0059964 A1 | 3/2010 | Morris |
| 2010/0109277 A1 | 5/2010 | Furrer |
| 2010/0121529 A1 | 5/2010 | Savaresi et al. |
| 2010/0152969 A1 | 6/2010 | Li et al. |
| 2010/0211261 A1 | 8/2010 | Sasaki et al. |
| 2010/0230876 A1 | 9/2010 | Inoue et al. |
| 2010/0238129 A1 | 9/2010 | Nakanishi et al. |
| 2010/0252972 A1 | 10/2010 | Cox et al. |
| 2010/0253018 A1 | 10/2010 | Peterson |
| 2010/0259018 A1 | 10/2010 | Honig et al. |
| 2010/0301571 A1 | 12/2010 | Van et al. |
| 2011/0035089 A1 | 2/2011 | Hirao et al. |
| 2011/0035105 A1 | 2/2011 | Jolly |
| 2011/0074123 A1 | 3/2011 | Fought et al. |
| 2011/0109060 A1 | 5/2011 | Earle et al. |
| 2011/0153158 A1 | 6/2011 | Acocella |
| 2011/0166744 A1 | 7/2011 | Lu et al. |
| 2011/0186360 A1 | 8/2011 | Brehob et al. |
| 2011/0190972 A1 | 8/2011 | Timmons et al. |
| 2011/0297462 A1 | 12/2011 | Grajkowski et al. |
| 2011/0297463 A1 | 12/2011 | Grajkowski et al. |
| 2011/0301824 A1 | 12/2011 | Nelson et al. |
| 2011/0301825 A1 | 12/2011 | Grajkowski et al. |
| 2012/0018263 A1 | 1/2012 | Marking |
| 2012/0029770 A1 | 2/2012 | Hirao et al. |
| 2012/0053790 A1 | 3/2012 | Oikawa |
| 2012/0053791 A1 | 3/2012 | Harada |
| 2012/0078470 A1 | 3/2012 | Hirao et al. |
| 2012/0119454 A1 | 5/2012 | Di Maria |
| 2012/0139328 A1 | 6/2012 | Brown et al. |
| 2012/0168268 A1 | 7/2012 | Bruno et al. |
| 2012/0222927 A1 | 9/2012 | Marking |
| 2012/0247888 A1 | 10/2012 | Chikuma et al. |
| 2012/0253601 A1 | 10/2012 | Ichida et al. |
| 2012/0265402 A1 | 10/2012 | Post et al. |
| 2012/0277953 A1 | 11/2012 | Savaresi et al. |
| 2013/0009350 A1 | 1/2013 | Wolf-Monheim |
| 2013/0018559 A1 | 1/2013 | Epple et al. |
| 2013/0030650 A1 | 1/2013 | Norris et al. |
| 2013/0041545 A1 | 2/2013 | Baer et al. |
| 2013/0060423 A1 | 3/2013 | Jolly |
| 2013/0060444 A1 | 3/2013 | Matsunaga et al. |
| 2013/0074487 A1 | 3/2013 | Herold et al. |
| 2013/0079988 A1 | 3/2013 | Hirao et al. |
| 2013/0092468 A1 | 4/2013 | Nelson et al. |
| 2013/0096784 A1 | 4/2013 | Kohler et al. |
| 2013/0096785 A1 | 4/2013 | Kohler et al. |
| 2013/0096793 A1 | 4/2013 | Krosschell |
| 2013/0103259 A1 | 4/2013 | Eng et al. |
| 2013/0158799 A1 | 6/2013 | Kamimura |
| 2013/0161921 A1 | 6/2013 | Cheng et al. |
| 2013/0190980 A1 | 7/2013 | Ramirez Ruiz |
| 2013/0197732 A1 | 8/2013 | Pearlman et al. |
| 2013/0197756 A1 | 8/2013 | Ramirez Ruiz |
| 2013/0218414 A1 | 8/2013 | Meitinger et al. |
| 2013/0226405 A1 | 8/2013 | Koumura et al. |
| 2013/0253770 A1 | 9/2013 | Nishikawa et al. |
| 2013/0261893 A1 | 10/2013 | Yang |
| 2013/0304319 A1 | 11/2013 | Daniels |
| 2013/0328277 A1 | 12/2013 | Ryan et al. |
| 2013/0334394 A1 | 12/2013 | Parison et al. |
| 2013/0338869 A1 | 12/2013 | Tsumano |
| 2013/0341143 A1 | 12/2013 | Brown |
| 2013/0345933 A1 | 12/2013 | Norton et al. |
| 2014/0001717 A1 | 1/2014 | Giovanardi et al. |
| 2014/0005888 A1 | 1/2014 | Bose et al. |
| 2014/0012467 A1 | 1/2014 | Knox et al. |
| 2014/0038755 A1 | 2/2014 | Ijichi et al. |
| 2014/0046539 A1 | 2/2014 | Wijffels et al. |
| 2014/0058606 A1 | 2/2014 | Hilton |
| 2014/0095022 A1 | 4/2014 | Cashman et al. |
| 2014/0125018 A1 | 5/2014 | Brady et al. |
| 2014/0129083 A1 | 5/2014 | O'Connor et al. |
| 2014/0131971 A1 | 5/2014 | Hou |
| 2014/0136048 A1 | 5/2014 | Ummethala et al. |
| 2014/0156143 A1 | 6/2014 | Evangelou et al. |
| 2014/0167372 A1 | 6/2014 | Kim et al. |
| 2014/0239602 A1 | 8/2014 | Blankenship et al. |
| 2014/0316653 A1 | 10/2014 | Kikuchi et al. |
| 2014/0353933 A1 | 12/2014 | Hawksworth et al. |
| 2014/0358373 A1 | 12/2014 | Kikuchi et al. |
| 2015/0039199 A1 | 2/2015 | Kikuchi |
| 2015/0046034 A1 | 2/2015 | Kikuchi |
| 2015/0057885 A1 | 2/2015 | Brady et al. |
| 2015/0081170 A1 | 3/2015 | Kikuchi |
| 2015/0081171 A1 | 3/2015 | Ericksen et al. |
| 2015/0329141 A1 | 11/2015 | Preijert |
| 2016/0059660 A1 | 3/2016 | Brady et al. |
| 2016/0107498 A1 | 4/2016 | Yamazaki |

(56) References Cited

U.S. PATENT DOCUMENTS

| | | | |
|---|---|---|---|
| 2016/0121905 | A1 | 5/2016 | Gillingham et al. |
| 2016/0153516 | A1 | 6/2016 | Marking |
| 2017/0008363 | A1 | 1/2017 | Ericksen et al. |
| 2017/0087950 | A1 | 3/2017 | Brady et al. |
| 2017/0321729 | A1 | 11/2017 | Melcher |
| 2018/0141543 | A1 | 5/2018 | Krosschell et al. |
| 2018/0297435 | A1 | 10/2018 | Brady et al. |
| 2018/0361853 | A1 | 12/2018 | Grajkowski et al. |
| 2019/0118898 | A1 | 4/2019 | Ericksen et al. |
| 2020/0016953 | A1 | 1/2020 | Oakden-Graus et al. |
| 2021/0070124 | A1 | 3/2021 | Brady et al. |
| 2021/0070125 | A1 | 3/2021 | Brady et al. |
| 2021/0070126 | A1 | 3/2021 | Brady et al. |
| 2021/0086578 | A1 | 3/2021 | Brady et al. |
| 2021/0162830 | A1 | 6/2021 | Graus et al. |
| 2021/0206263 | A1 | 7/2021 | Grajkowski et al. |
| 2021/0316716 | A1 | 10/2021 | Krosschell et al. |
| 2021/0362806 | A1 | 11/2021 | Hedlund et al. |

FOREIGN PATENT DOCUMENTS

| | | | |
|---|---|---|---|
| CA | 2260292 | A1 | 7/2000 |
| CA | 2851626 | A1 | 4/2013 |
| CA | 2963790 | A1 | 4/2016 |
| CN | 2255379 | Y | 6/1997 |
| CN | 2544987 | Y | 4/2003 |
| CN | 1660615 | A | 8/2005 |
| CN | 1746803 | A | 3/2006 |
| CN | 1749048 | A | 3/2006 |
| CN | 1810530 | A | 8/2006 |
| CN | 101549626 | A | 10/2009 |
| CN | 201723635 | U | 1/2011 |
| CN | 102069813 | A | 5/2011 |
| CN | 102168732 | A | 8/2011 |
| CN | 201914049 | U | 8/2011 |
| CN | 202040257 | U | 11/2011 |
| CN | 102616104 | A | 8/2012 |
| CN | 102627063 | A | 8/2012 |
| CN | 102678808 | A | 9/2012 |
| CN | 202449059 | | 9/2012 |
| CN | 102729760 | A | 10/2012 |
| CN | 202468817 | U | 10/2012 |
| CN | 102840265 | A | 12/2012 |
| CN | 103079934 | | 5/2013 |
| CN | 103318184 | | 9/2013 |
| CN | 106794736 | A | 5/2017 |
| CN | 103857576 | B | 8/2017 |
| CN | 107521449 | A | 12/2017 |
| CN | 107521499 | A | 12/2017 |
| DE | 4017255 | A1 | 12/1990 |
| DE | 4323589 | A1 | 1/1994 |
| DE | 4328551 | A1 | 3/1994 |
| DE | 19508302 | A1 | 9/1996 |
| DE | 19922745 | A1 | 12/2000 |
| DE | 102010020544 | A1 | 1/2011 |
| DE | 102012101278 | A1 | 8/2013 |
| EP | 0398804 | A1 | 11/1990 |
| EP | 0403803 | A1 | 12/1990 |
| EP | 0544108 | A1 | 6/1993 |
| EP | 0546295 | A1 | 6/1993 |
| EP | 0405123 | | 10/1993 |
| EP | 0473766 | | 2/1994 |
| EP | 0691226 | A1 | 1/1996 |
| EP | 1005006 | A2 | 5/2000 |
| EP | 1172239 | A2 | 1/2002 |
| EP | 1219475 | A1 | 7/2002 |
| EP | 1258706 | A2 | 11/2002 |
| EP | 1355209 | A1 | 10/2003 |
| EP | 1449688 | A2 | 8/2004 |
| EP | 1164897 | | 2/2005 |
| EP | 2123933 | A2 | 11/2009 |
| EP | 2216191 | A1 | 8/2010 |
| EP | 2268496 | A1 | 1/2011 |
| EP | 2397349 | A1 | 12/2011 |
| EP | 2517904 | A1 | 10/2012 |
| EP | 3150454 | A1 | 4/2017 |
| EP | 3204248 | A1 | 8/2017 |
| FR | 2935642 | | 3/2010 |
| GB | 2233939 | A | 1/1991 |
| GB | 2234211 | A | 1/1991 |
| IN | 20130233813 | | 8/2014 |
| JP | 01-208212 | | 8/1989 |
| JP | 02-155815 | A | 6/1990 |
| JP | 04-368211 | A | 12/1992 |
| JP | 05-178055 | A | 7/1993 |
| JP | 06-156036 | A | 6/1994 |
| JP | 07-117433 | A | 5/1995 |
| JP | 07-186668 | A | 7/1995 |
| JP | 09-203640 | A | 8/1997 |
| JP | 2898949 | B2 | 6/1999 |
| JP | 2956221 | B2 | 10/1999 |
| JP | 11-321754 | A | 11/1999 |
| JP | 3087539 | B2 | 9/2000 |
| JP | 2001-018623 | A | 1/2001 |
| JP | 3137209 | B2 | 2/2001 |
| JP | 2001-121939 | A | 5/2001 |
| JP | 2002-219921 | A | 8/2002 |
| JP | 2008-273246 | | 11/2008 |
| JP | 2009-035220 | A | 2/2009 |
| JP | 2009-160964 | A | 7/2009 |
| JP | 4584510 | B2 | 11/2010 |
| JP | 2011-126405 | A | 6/2011 |
| JP | 5149443 | B2 | 2/2013 |
| JP | 2013-173490 | A | 9/2013 |
| JP | 2013-189109 | A | 9/2013 |
| TW | M299089 | U | 10/2006 |
| WO | 92/10693 | A1 | 6/1992 |
| WO | 96/05975 | A1 | 2/1996 |
| WO | 99/59860 | A1 | 11/1999 |
| WO | 00/53057 | A1 | 9/2000 |
| WO | 02/20318 | A1 | 3/2002 |
| WO | 2009/133000 | A1 | 11/2009 |
| WO | 2012/028923 | A1 | 3/2012 |
| WO | 2015/004676 | A1 | 1/2015 |
| WO | 2016/057555 | A1 | 4/2016 |
| WO | 2020/089837 | A1 | 5/2020 |

OTHER PUBLICATIONS

Office Action issued by the Canadian Intellectual Property Office, dated May 10, 2021, for Canadian Patent Application No. 2,890,996; 3 pages.

International Preliminary Report on Patentability received for PCT Patent Application No. PCT/IB2019/060089, dated Jun. 3, 2021, 22 pages.

International Search Report and Written Opinion received for PCT Patent Application No. PCT/IB2019/060089, dated May 29, 2020, 24 pages.

International Search Report and Written Opinion received for PCT Patent Application No. PCT/US2021/033199, dated Aug. 23, 2021, 14 pages.

Compare: Three Selectable Terrain Management Systems, Independent Land Rover News Blog, retrieved from https://web.archive.org/web/20120611082023/ . . . ; archive date Jun. 11, 2012; 4 pages.

EDFC Active Adjust Damping Force Instantly according to G-Force & Speed, TEIN, retrieved from https://web.archive.org/web/20140528221849/ . . . ; archive date May 28, 2014; 18 pages.

EDFC Active Adjust Damping Force Instantly according to G-Force & Speed, TEIN, retrieved from https://web.archive.org/web/20160515190809/ . . . ; archive date May 15, 2016; 22 pages.

Examination Report No. 1 issued by the Australian Government IP Australia, dated Aug. 10, 2018, for Australian Patent Application No. 2015328248; 2 pages.

First drive: Ferrari's easy-drive supercar, GoAuto.com.au, Feb. 16, 2010; 4 pages.

Ingalls, Jake; Facebook post https://www.facebook.com/groups/877984048905836/permalink/110447996625624-2; Sep. 11, 2016; 1 page.

International Preliminary Amendment issued by The International Bureau of WIPO, dated May 21, 2019, for International Patent Application No. PCT/US2017/062303; 22 pages.

(56) References Cited

OTHER PUBLICATIONS

International Preliminary Report on Patentability issued by the European Patent Office, dated Apr. 11, 2017, for International Patent Application No. PCT/US2015/054296; 7 pages.
International Preliminary Report on Patentability issued by the International Bureau of WIPO, dated Dec. 10, 2019, for International Patent Application No. PCT/US2018/036383; 8 pages.
International Preliminary Report on Patentability issued by the International Bureau of WIPO, dated May 12, 2015, for International Application No. PCT/US2013/068937; 7 pages.
International Search Report and Written Opinion issued by the European Patent Office, dated Feb. 18, 2014, for International Application No. PCT/US2013/068937; 11 pAGES.
International Search Report and Written Opinion received for PCT Patent Application No. PCT/US2015/054296, dated Dec. 18, 2015, 9 pages.
International Search Report issued by the International Searching Authority, dated Jun. 7, 2018, for related International Patent Application No. PCT/US2017/062303; 7 pages.
International Search Report of the International Searching Authority, dated Aug. 31, 2018, for International Patent Application No. PCT/US2018/036383; 7 pages.
Office Action issued by the Canadian Intellectual Property Office, dated Jul. 26, 2019, for Canadian Patent Application No. 2,963,790; 3 pages.

Written Opinion issued by the International Searching Authority, dated Jun. 7, 2018, for related International Patent Application No. PCT/US2017/062303; 22 pages.
Written Opinion of the International Searching Authority, dated Aug. 31, 2018, for International Patent Application No. PCT/US2018/036383; 8 pages.
Gangadurai et al.; Development of control strategy for optimal control of a continuously variable transmission operating in combination with a throttle controlled engine; SAE International; Oct. 12, 2005.
Unno et al.; Development of Electronically Controlled DVT Focusing on Rider's Intention of Acceleration and Deceleration; SAE International; Oct. 30, 2007.
Ackermann et al., "Robust steering control for active rollover avoidance of vehicles with elevated center of gravity", Jul. 1998, pp. 1-6.
Bhattacharyya et al., "An Approach to Rollover Stability in Vehicles Using Suspension Relative Position Sensors and Lateral Acceleration Sensors", Dec. 2005, 100 pages.
Hac et al., "Improvements in vehicle handling through integrated control of chassis systems", Int. J. of Vehicle Autonomous Systems(IJVAS), vol. 1, No. 1, 2002, pp. 83-110.
Huang et al., "Nonlinear Active Suspension Control Design Applied to a Half-Car Model", Proceedings of the 2004 IEEE International Conference on Networking, Mar. 21-23, 2004, pp. 719-724.

ADJUSTABLE VEHICLE SUSPENSION SYSTEM

CROSS-REFERENCE TO RELATED APPLICATIONS

The present application is a continuation of U.S. patent application Ser. No. 16/529,001, filed Aug. 1, 2019, which is a continuation of U.S. patent application Ser. No. 15/618,793, filed Jun. 9, 2017, titled "ADJUSTABLE VEHICLE SUSPENSION SYSTEM", the complete disclosure of which is expressly incorporated by reference herein.

BACKGROUND AND SUMMARY OF THE DISCLOSURE

The present disclosure relates to improved suspension for a vehicle and in particular to systems and methods of damping and/or rebound control for shock absorbers.

Currently some off-road vehicles include adjustable shock absorbers. These adjustments include spring preload, high and low speed compression damping and/or rebound damping. In order to make these adjustments, the vehicle is stopped and the operator makes an adjustment at each shock absorber location on the vehicle. A tool is often required for the adjustment. Some on-road automobiles also include adjustable electric shocks along with sensors for active ride control systems. The system of the present disclosure allows an operator to make real time "on-the-go" adjustments to the shocks to obtain the most comfortable ride for given terrain and payload scenarios.

Exemplary systems are disclosed in U.S. Pat. No. 9,010,768 and US Published Patent Application No. 2016/0059660, both assigned to the present assignee and the entire disclosures of each expressly incorporated by reference herein.

Vehicles often have springs (coil, leaf, or air) at each wheel, rack, or ski to support a majority of the load. The vehicle of the present disclosure also has electronic shocks controlling the dynamic movement of each wheel, ski, or track. The electronic shocks have one or more valves that control the damping force of each shock. This valve may control compression damping only, rebound damping only, or a combination of compression and rebound damping. The valve(s) may be connected to a controller having a user interface that is within the driver's reach for adjustment while operating the vehicle.

In an exemplary embodiment of the present disclosure, a method of controlling a damping characteristic of an adjustable shock absorber of a vehicle being operated by a driver, the driver steering the vehicle by holding a steering device with the hands of the driver, is provided. The method comprising the steps of (a) electronically controlling with at least one controller the damping characteristic of the adjustable shock absorber based on a plurality of inputs from a plurality of sensors supported by the vehicle at a first time; (b) receiving at a second time subsequent to the first e a driver initiated request to alter the damping characteristic of the adjustable shock absorber through an driver actuatable input; (c) altering with the at least one controller, at a third time subsequent to the second time, the damping characteristic of the adjustable shock absorber based on the received driver initiated request; and (d) automatically altering with the at least one controller, at a fourth time subsequent to the third time, the damping characteristic of the adjustable shock absorber based on the plurality of inputs from the plurality of sensors.

In an example thereof, the vehicle maintains a ground speed of greater than zero from the first time through the fourth time. In another example thereof, the damping characteristic at the fourth time is based on the plurality of inputs from the plurality of sensors supported by the vehicle at the fourth time.

In yet another example thereof, step (c) of the method includes the steps of deviating a stiffness of the damping characteristic of the adjustable shock absorber relative to the stiffness of the damping characteristic of the adjustable shock absorber at the first time; and at a fifth time between the third time and the fourth time, altering the stiffness of the damping characteristic of the adjustable shock absorber towards a current determined damping characteristic of the adjustable shock absorber based on the plurality of inputs from the plurality of sensors. In a variation thereof, the stiffness of the damping characteristic of the adjustable shock absorber is held at a deviated level between the third time and the fifth time. In another variation thereof, the step of altering the stiffness of the damping characteristic of the adjustable shock absorber at the fifth time includes the step of linearly altering the stiffness of the damping characteristic of the adjustable shock absorber from the deviated level to the current determined damping characteristic of the adjustable shock absorber based on the plurality of inputs from the plurality of sensors. In yet another variation thereof, the step of altering the stiffness of the damping characteristic of the adjustable shock absorber at the fifth time includes the step of linearly altering the stiffness of the damping characteristic of the adjustable shock absorber to the current determined damping characteristic of the adjustable shock absorber based on the plurality of inputs from the plurality of sensors.

In yet another example, the vehicle includes a plurality of ground engaging members; a frame coupled to the plurality of ground engaging members through a plurality of suspensions, a first ground engaging member of the plurality of ground engaging members being coupled to the frame through a first suspension, the first suspension including a first adjustable shock absorber of the at least one adjustable shock absorber, a second ground engaging member of the plurality of ground engaging members being coupled to the frame through a second suspension, the second suspension including a second adjustable shock absorber of the at least one adjustable shock absorber, and a third ground engaging member of the plurality of ground engaging members being coupled to the frame through a third suspension, the third suspension including a third adjustable shock absorber of the at least one adjustable shock absorber; and a driver seat supported by the frame and having a seating surface positioned rearward of the steering device, the first adjustable shock absorber and the second adjustable shock absorber being positioned forward of the steering device and the third adjustable shock absorber being positioned rearward of the steering device, wherein in step (c) the damping characteristic of the first adjustable shock absorber and the damping characteristic of the second adjustable shock absorber are altered. In a variation thereof, step (c) of the method includes the steps of deviating a stiffness of the damping characteristic of the first adjustable shock absorber relative to the stiffness of the damping characteristic of the first adjustable shock absorber at the first time and deviating a stiffness of the damping characteristic of the second adjustable shock absorber relative to the stiffness of the damping characteristic of the second adjustable shock absorber at the first time; and at a fifth time between the third time and the fourth time, altering the stiffness of the damping characteristic of the first adjustable shock absorber towards a current determined damping characteristic of the first adjustable shock absorber based on the plurality of inputs from the plurality of sensors and altering the stiffness of the damping characteristic of the second adjustable shock absorber towards a current determined damping characteristic of the second adjustable shock absorber based on the plurality of inputs from the plurality of sensors.

In still another example, step (c) of the method includes the steps of deviating a stiffness of the damping characteristic of the at least one adjustable shock absorber relative to the stiffness of the damping characteristic of the at least one adjustable shock absorber at the first time; and at a fifth time between the third time and the fourth time, altering the stiffness of the damping characteristic of the at least one adjustable shock absorber, wherein the fifth time is a predetermined time delay period from the third time. In a variation thereof, the step of altering the stiffness of the damping characteristic of the at least one adjustable shock absorber includes altering the stiffness of the damping characteristic of the at least one adjustable shock absorber towards a current determined damping characteristic of the at least one adjustable shock absorber based on the plurality of inputs from the plurality of sensors. In a further variation thereof, the driver initiated request corresponds to an actuation of the driver actuatable input from a first configuration to a second configuration and the method further comprises the step of initiating the predetermined time delay period upon the actuation of the driver actuatable input to the second configuration. In yet another variation thereof, the driver initiated request corresponds to an actuation of the driver actuatable input from a first configuration to a second configuration and the method further comprises the step of initiating the predetermined time delay period upon a detection of the driver actuatable input returning towards the first configuration. In yet still another variation, the driver initiated request corresponds to an actuation of the driver actuatable input from a first configuration to a second configuration and the method further comprises the steps of initiating the predetermined time delay period upon one of the actuation of the driver actuatable input to the second configuration and a detection of the driver actuatable input returning towards the first configuration; receiving at a sixth time subsequent to the third time and prior to the fifth time, a second driver initiated request to alter the damping characteristic of the adjustable shock absorber through the driver actuatable input; and delaying the fifth time by resetting the predetermined time delay based on the second driver initiated request. In still a further variation, the driver actuatable input is a brake pedal and the step of receiving at the second time subsequent to the first time the driver initiated request includes the step of detecting a tapping of the brake pedal.

In yet still another example, the driver actuatable input is actuatable by the driver in the absence of requiring a removal of either of the hands of the driver from the steering device. In a variation thereof, step (c) of the method includes the steps of increasing a stiffness of the damping characteristic of the adjustable shock absorber relative to the stiffness of the damping characteristic of the adjustable shock absorber at the first time; and at a fifth time between the third time and the fourth time, reducing the stiffness of the damping characteristic of the adjustable shock absorber towards a current determined damping characteristic of the adjustable shock absorber based on the plurality of inputs from the plurality of sensors. In a further variation, the stiffness of the damping characteristic of the adjustable shock absorber is held at a constant level between the third time and the fifth time. In still a further variation, the step of reducing the stiffness of the damping characteristic of the adjustable shock absorber at the fifth time includes the step of linearly reducing the stiffness of the damping characteristic of the adjustable shock absorber from the constant level to the current determined damping characteristic of the adjustable shock absorber based on the plurality of inputs from the plurality of sensors.

In another exemplary embodiment of the present disclosure, a vehicle for operation by a driver is provided. The vehicle comprising a plurality of ground engaging members; a plurality of suspensions supported by the plurality of ground engaging members, the plurality of suspensions including a plurality of adjustable shock absorbers; a frame coupled to the plurality of ground engaging members through the plurality of suspensions, a first ground engaging member of the plurality of ground engaging members being coupled to the frame through a first suspension, the first suspension including a first adjustable shock absorber of the plurality of adjustable shock absorbers, a second ground engaging member of the plurality of ground engaging members being coupled to the frame through a second suspension, the second suspension including a second adjustable shock absorber of the plurality of adjustable shock absorbers, and a third ground engaging member of the plurality of ground engaging members being coupled to the frame through a third suspension, the third suspension including a third adjustable shock absorber of the plurality of adjustable shock absorbers; a steering system supported by the frame and including a steering device operatively coupled to at least one of the plurality of ground engaging members to steer the vehicle; a driver actuatable input which is positioned to be actuatable by the driver; a driver seat supported by the frame and having a seating surface positioned rearward of the steering device, the first adjustable shock absorber and the second adjustable shock absorber being positioned forward of the steering device and the third adjustable shock absorber being positioned rearward of the steering device; a plurality of sensors supported by the plurality of ground engaging members; and at least one controller operatively coupled to the plurality of adjustable shock absorbers and the plurality of sensors. The at least one controller configured to (a) determine a damping characteristic of at least one of plurality of adjustable shock absorbers based on a plurality of inputs from the plurality of sensors; (b) receive a driver initiated request to alter the damping characteristic of the at least one of the plurality of adjustable shock absorbers from the driver actuatable input; (c) alter the damping characteristic of the at least one of the plurality of adjustable shock absorbers in response to the received driver initiated request for a first period of time, and (d) subsequent to (c), automatically alter the damping characteristic of the at least one of the plurality of adjustable shock absorbers again based on the plurality of inputs from the plurality of sensors at an expiration of the first period of time.

In an example thereof, the driver actuatable input is supported by the steering device. In a variation thereof, the steering device further supports a suspension damping ride mode configuration driver actuatable input.

In another example, the steering device is a steering wheel. In still another example, the steering device is a handlebar.

In still a further example, the driver actuatable input is positioned lower than the steering device. In a variation thereof, the driver actuatable input is a foot actuatable input device. In a further variation thereof, the foot actuatable input is a brake pedal.

In still yet a further example, a driver engageable surface of the driver actuatable input is positioned lower than the seating surface of the driver seat. In a variation thereof, the driver actuatable input is a foot actuatable input device. In a further variation thereof, the foot actuatable input is a brake pedal.

In still another example, the at least one controller permits the vehicle to have a ground speed of greater than zero while the at least one controller executes (a) through (d).

In a further still example, the at least one controller in (c) deviates a stiffness of the damping characteristic of the at least one adjustable shock absorber of the plurality of adjustable shock absorbers for a first portion of the first time period and subsequently alters the stiffness of the damping characteristic of the at least one adjustable shock absorber of the plurality of adjustable shock absorbers for a second portion of the first time period. In a variation thereof, the at least one controller holds the stiffness of the damping characteristic of the at least one adjustable shock absorber of the plurality of adjustable shock absorbers at a deviated level during the first portion of the first time period. In another variation thereof, the at least one controller linearly alters the stiffness of the damping characteristic of the at least one adjustable shock absorber of the plurality of adjustable shock absorbers during the second portion of the first time period.

In yet a further still example, the at least one adjustable shock absorber of the plurality of adjustable shock absorbers includes the first adjustable shock absorber and the second adjustable shock absorber. In a variation thereof, the at least one controller in (c) deviates the damping characteristic of the first adjustable shock absorber and the damping characteristic of the second adjustable shock absorber for a first portion of the first time period and subsequently alters the damping characteristic of the first adjustable shock absorber and the damping characteristic of the second adjustable shock absorber for a second portion of the first time period. In a further variation thereof, the damping characteristic of the first adjustable shock absorber and the damping characteristic of the second adjustable shock absorber is altered linearly during the second portion of the first time period.

In yet a still further example, the driver actuatable input which is positioned to be actuatable by the driver in the absence of requiring a removal of either of the hands of the driver from the steering device.

Additional features of the present disclosure will become apparent to those skilled in the art upon consideration of the following detailed description of illustrative embodiments exemplifying the best mode of carrying out the invention as presently perceived.

BRIEF DESCRIPTION OF THE DRAWINGS

The foregoing aspects and many additional features of the present system and method will become more readily appreciated and become better understood by reference to the following detailed description when taken in conjunction with the accompanying drawings.

Figure 1:
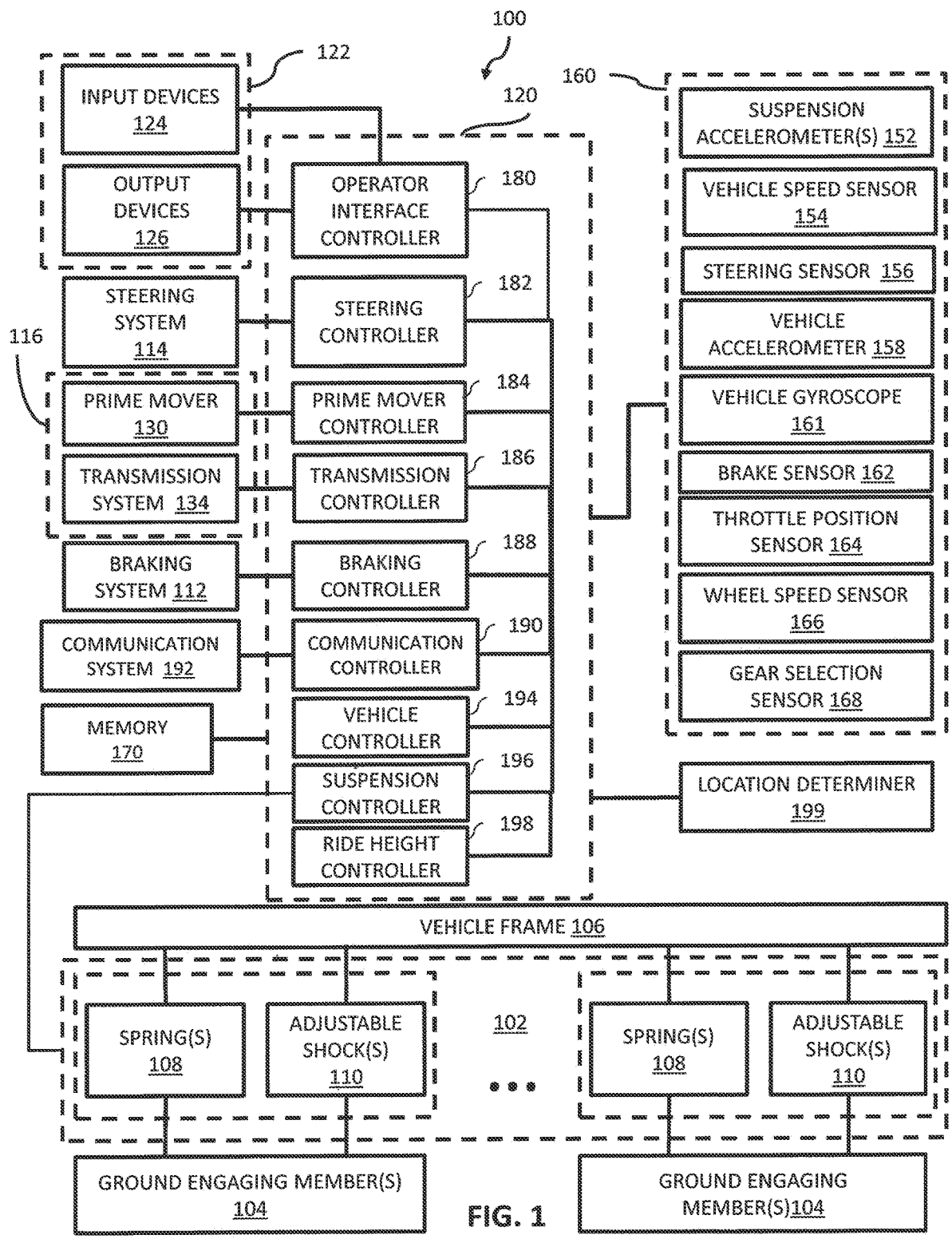
FIG. 1 illustrates a representative view of components of a vehicle of the present disclosure having a suspension with a plurality of adjustable shock absorbers and a plurality of sensors.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure.

DETAILED DESCRIPTION OF THE DRAWINGS

For the purposes of promoting an understanding of the principles of the present disclosure, reference will now be made to the embodiments illustrated in the drawings, which are described below. The embodiments disclosed below are not intended to be exhaustive or limited to the precise form disclosed in the following detailed description. Rather, the embodiments are chosen and described so that others skilled in the art may utilize their teachings.

Referring now to FIG. 1, the present disclosure relates to a vehicle 100 having a suspension system 102 located between a plurality of ground engaging members 104 and a vehicle frame 106. Exemplary ground engaging members 104 include wheels, skis, guide tracks, treads or other suitable devices for supporting the vehicle relative to the ground. The suspension typically includes springs 108 and adjustable shock absorbers 110 coupled between the ground engaging members 104 and the frame 106. Springs 108 may include, for example, coil springs, leaf springs, air springs or other gas springs. Exemplary air or gas springs 108 may be adjustable. See, for example, U.S. Pat. No. 7,950,486, assigned to the current assignee, the entire disclosure of which is incorporated herein by reference.

Adjustable shock absorbers 110 are often coupled between the vehicle frame 106 and the ground engaging members 104 through an A-arm linkage or other type linkage. Springs 108 are also coupled between the ground engaging members 104 and the vehicle frame 106.

In one embodiment, adjustable shock absorbers 110 include a damping control activator which is coupled to controller 120 by wires. An exemplary damping control activator is an electronically controlled valve which is activated to increase or decrease the damping characteristics of adjustable shock absorber 110.

In one embodiment, each adjustable shock absorber 110 includes solenoid valves mounted at the base of the shock body or internal to a damper piston of the adjustable shock absorber 110. The stiffness of adjustable shock absorber 110 is increased or decreased by introducing additional fluid to the interior of the shock absorber, removing fluid from the interior of the shock absorber, and/or increasing or decreasing the ease with which fluid can pass from a first side of a damping piston of the shock absorber to a second side of the damping piston of the shock absorber.

In another embodiment, adjustable shock absorber 110 includes a magnetorheological fluid internal to adjustable shock absorber 110. The stiffness of the shock is increased or decreased by altering a magnetic field experienced by the magnetorheological fluid. Additional details on exemplary adjustable shocks are provided in US Published Patent Application No. 2016/0059660, filed Nov. 6, 2015, titled VEHICLE HAVING SUSPENSION WITH CONTINUOUS DAMPING CONTROL, assigned to the present assignee, the entire disclosure of which is expressly incorporated by reference herein.

In one embodiment, a spring 108 and a shock 110 are located adjacent each of the ground engaging members 104. In an ATV, for example, a spring 108 and an adjustable shock 110 are provided adjacent each of the four ground engaging members 104 of the ATV. Some manufacturers offer adjustable springs 108 in the form of either air springs or hydraulic preload rings. These adjustable springs 108 allow the operator to adjust the ride height on the go. However, a majority of ride comfort comes from the damping provided by adjustable shock absorbers 110.

In one embodiment, adjustable shocks 110 are electrically controlled shocks for adjusting damping characteristics of shocks 110. A controller 120 provides signals to adjust damping of adjustable shocks 110 in a continuous or dynamic manner. Adjustable shocks 110 may be adjusted to provide differing compression damping, rebound damping or both.

In one embodiment, controller 120 is microprocessor-based and includes processing instructions stored on a non-transitory computer readable medium, such as memory 170, which are executable by the microprocessor of controller 120 to control operation of suspension system 102. The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. This disclosure contemplates other embodiments in which controller 120 is not microprocessor-based, but rather is configured to control operation of suspension system 102 based on one or more sets of hardwired instructions and/or software instructions stored in memory 170. Further, controller 120 may be contained within a single device or be a plurality of devices networked together, as illustrated in FIG. 1, to provide the functionality described herein.

Vehicle 100 includes a user interface 122 including a plurality of input devices 124 and a plurality of output devices 126. Input devices 124 are actuatable by a driver of vehicle 100 to provide a driver initiated request to controller 120. Output devices 126 provide feedback to the driver of the operational characteristics of vehicle 100.

Exemplary input devices include levers, buttons, switches, soft keys, touch screens, dials, and other suitable devices which are actuatable by the driver. Input devices 124 provide the driver to communicate various driver initiated requests to controller 120. For example, a driver may communicate a driver initiated request to alter a damping characteristic of one or more of adjustable shocks 110. Further, a driver may communicate a driver initiated request to select a ride mode which alters a baseline setup, such as a damping profile, for suspension system 102 and potentially one or more additional systems of vehicle 100, such as steering system 114 and power system 116. Additional details regarding exemplary ride modes and input devices to initiate each are provided in U.S. Patent Application Ser. No. 62/424,285, filed Nov. 18, 2016, and U.S. patent application Ser. No. 15/377,640, filed Dec. 13, 2016, the entire disclosures of which are expressly incorporated by reference herein.

In one embodiment, one or more input devices 24 are supported by a steering control of steering system 114. Exemplary steering controls include handlebars, a steering wheel, and other suitable devices held and actuatable by the driver to provide an input on a desired steering angle of vehicle 100.

In one embodiment, a driver actuatable device of vehicle 100 may be dual purpose device. For example, a brake pedal is actuatable by a foot of the driver to provide an input to a braking system 112 of vehicle 100 to brake one or more of ground engaging members 104. The brake pedal may further be used as an input device to signal to controller 120 a driver initiated request regarding a damping characteristic of adjustable shocks 110. As an example, a driver may momentarily depress the brake pedal partway, commonly known as tapping the brakes, and controller 120 interprets that action as a driver initiated request to deviate a damping characteristic of one or more of adjustable shocks 110. In one example, the damping characteristic is deviated by increasing a damping characteristic of one or more adjustable shocks. In another example, the damping characteristic is deviated by decreasing a damping characteristic of one or more adjustable shocks. Exemplary damping characteristics include compression damping amount, rebound damping amount, or both compression damping amount and rebound damping amount.

Exemplary output devices 126 include gauges, lights, displays, touch screens, audio devices, tactile devices, and other suitable devices which provide feedback information to the driver of the operational characteristics of vehicle 100. Exemplary output devices are disclosed in U.S. Patent Application Ser. No. 62/424,285, filed Nov. 18, 2016, and U.S. patent application Ser. No. 15/377,640, filed Dec. 13, 2016, the entire disclosures of which are expressly incorporated by reference herein.

In one embodiment, a portion of input devices 124 and output devices are part of an integrated dashboard display of vehicle 100 and a portion of input devices 124 are provided on a steering control of steering systems 114 and/or as foot actuated input devices actuatable by the driver of vehicle 100. Additional details regarding exemplary displays are provided in U.S. Patent Application Ser. No. 62/424,285, filed Nov. 18, 2016, and U.S. patent application Ser. No. 15/377,640, filed Dec. 13, 2016, the entire disclosures of which are expressly incorporated by reference herein.

Figure 2:
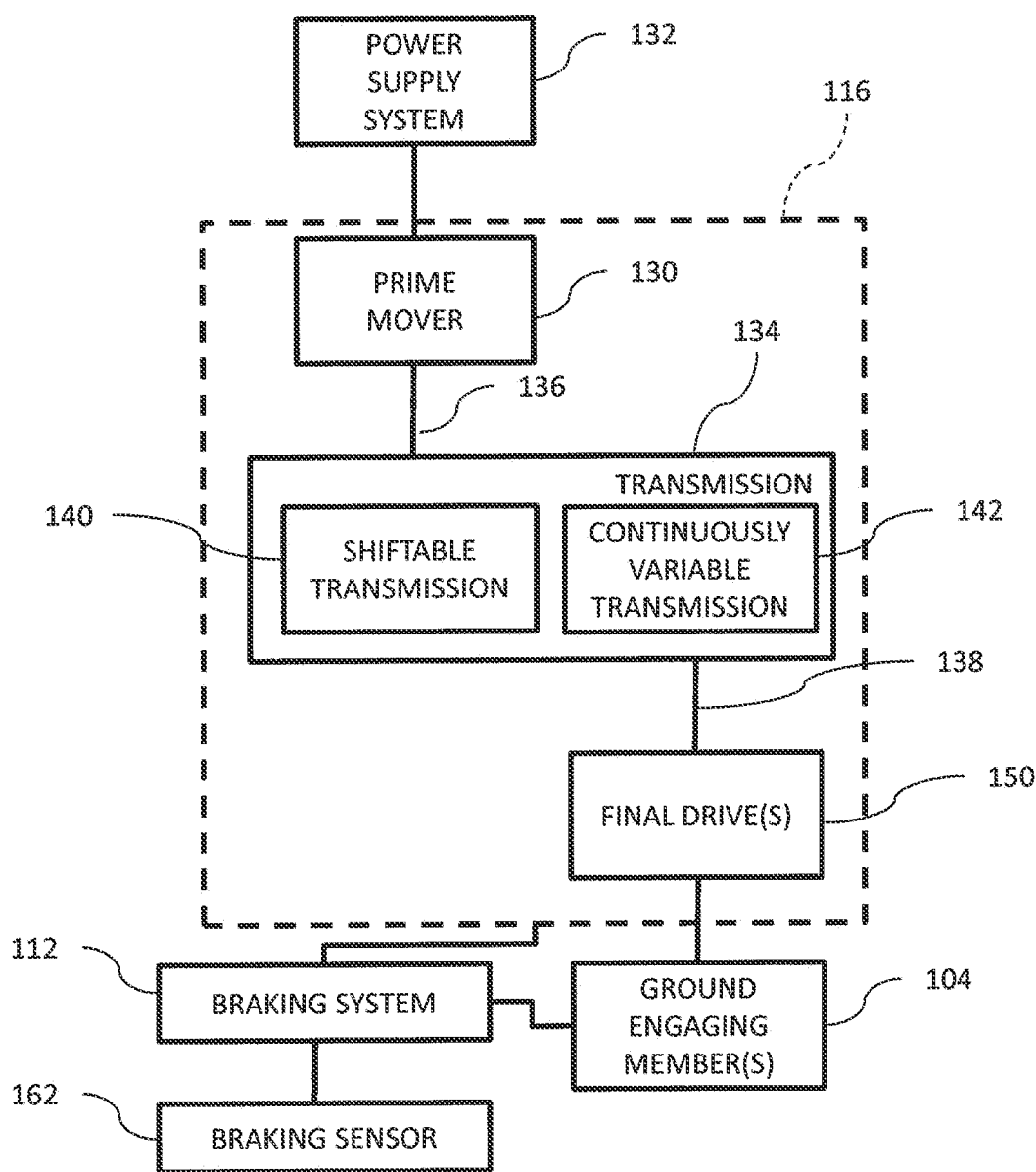
FIG. 2 illustrates an exemplary power system of the vehicle of FIG. 1.
Figure 3:
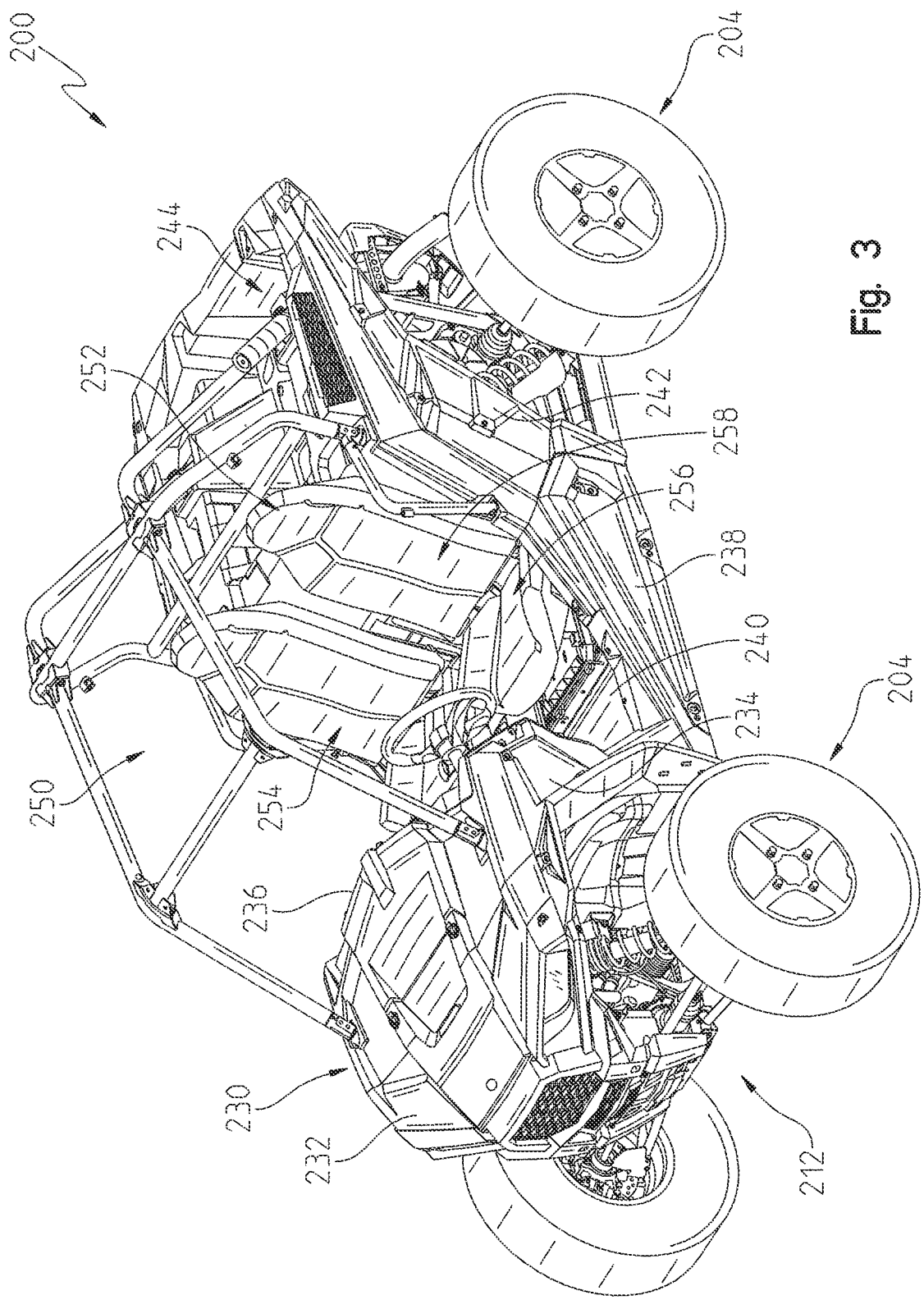
FIG. 3 illustrates a front, left perspective view of an exemplary side-by-side vehicle.
Figure 4:
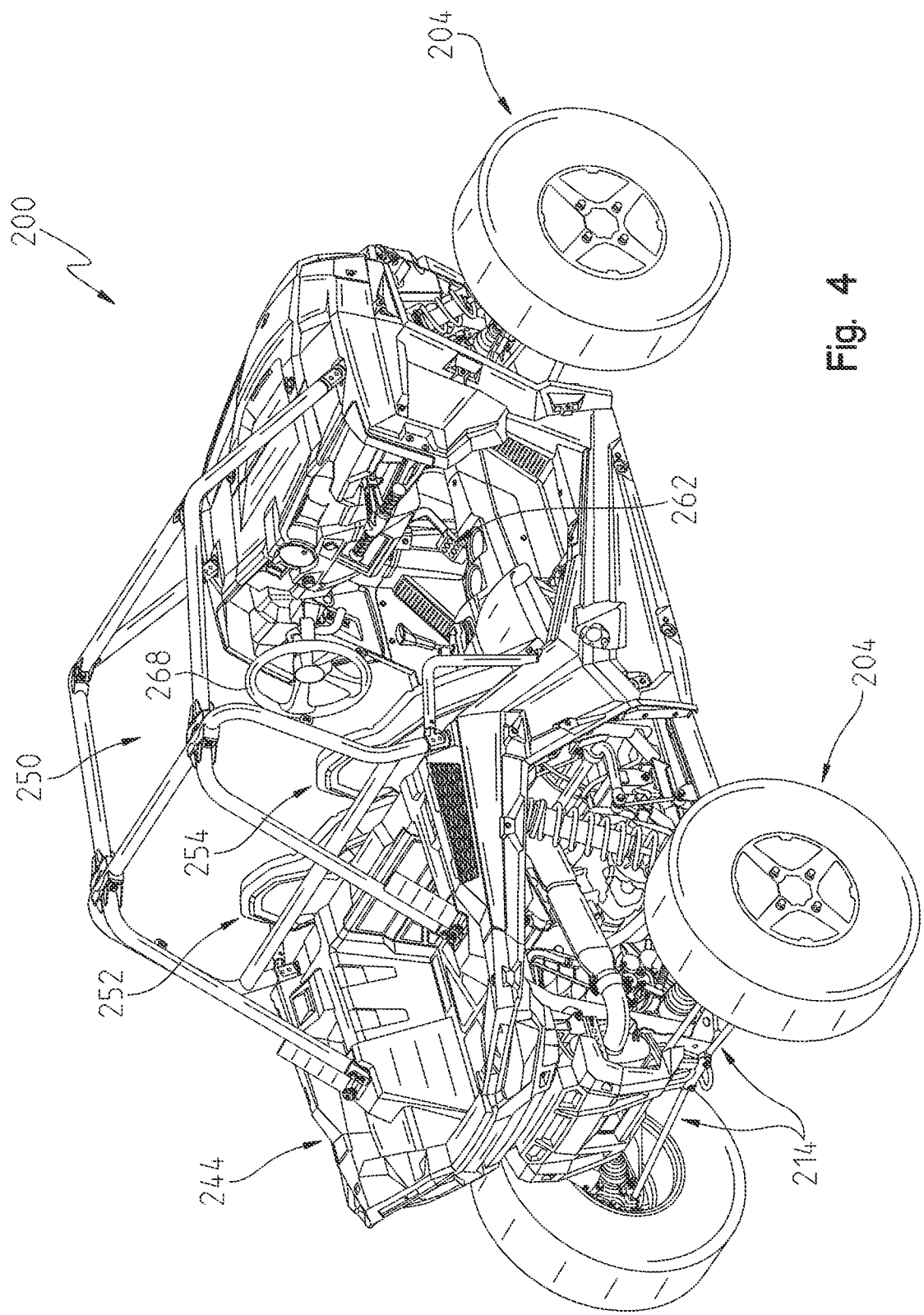
FIG. 4 illustrates a rear right perspective view of the vehicle of FIG. 3.

Referring to the illustrated embodiment of FIG. 2, power system 116 of vehicle 100 includes a prime mover 130. Exemplary prime movers 130 include internal combustion engines, two stroke internal combustion engines, four stroke internal combustion engines, diesel engines, electric motors, hybrid engines, and other suitable sources of motive force. To start the prime mover 130, a power supply system 132 is provided. The type of power supply system 132 depends on the type of prime mover 130 included in vehicle 100. In one embodiment, prime mover 130 is an internal combustion engine and power supply system 132 is one of a pull start system and an electric start system. In one embodiment, prime mover 130 is an electric motor and power supply system 132 is a switch system which electrically couples one or more batteries to the electric motor.

A transmission 134 is coupled to prime mover 130. Transmission 134 converts a rotational speed of an output shaft 136 of prime mover 130 to one of a faster rotational speed or a slower rotational speed of an output shaft 138 of transmission 134. It is contemplated that transmission 134 may additionally rotate output shaft 138 at the same speed as output shaft 136.

In the illustrated embodiment, transmission 134 includes a shiftable transmission 140 and a continuously variable transmission ("CVT") 142. In one example, an input member of CVT 142 is coupled to output shaft 136 of prime mover 130. An input member of shiftable transmission 140 is in turn coupled to an output member of CVT 142. In one embodiment, shiftable transmission 140 includes a forward high setting, a forward low setting, a neutral setting, a park setting, and a reverse setting. The power communicated from prime mover 130 to CVT 142 is provided to a drive member of CVT 142. The drive member in turn provides power to a driven member through a belt or other member. Exemplary CVTs are disclosed in U.S. Pat. Nos. 3,861,229; 6,176,796; 6,120,399; 6,860,826; and 6,938,508, the disclosures of which are expressly incorporated by reference herein. The driven member provides power to an input shaft of shiftable transmission 140. Although transmission 134 is illustrated as including both shiftable transmission 140 and CVT 142, transmission 134 may include only one of shiftable transmission 140 and CVT 142. Further, transmission 134 may include one or more additional components.

Transmission 134 is further coupled to at least one final drive 150 which is in turn coupled to at least one of ground engaging members 104. Exemplary final drives include gear reduction units, differentials, and other suitable units for coupling transmission 134 to ground engaging members 104. Final drive 150 may communicate the power from transmission 134 to one of ground engaging members 104 or multiple ground engaging members 104. In an ATV embodiment, one or both of a front differential and a rear differential are provided. The front differential powering at least one of two front wheels of the ATV and the rear differential powering at least one of two rear wheels of the ATV. In a side-by-side vehicle embodiment having seating for at least an operator and a passenger in a side-by-side configuration, such as vehicle 200 illustrated in FIGS. 3-9, one or both of a front differential and a rear differential are provided. The front differential powering at least one of two front wheels of the side-by-side vehicle 200 and the rear differential powering at least one of multiple rear wheels of the side-by-side vehicle 200. In one example, the side-by-side vehicle has three axles and a differential is provided for each axle.

In one embodiment, braking system 112 may be coupled to any of prime mover 130, transmission 134, final drive 150, and ground engaging members 104 or the connecting drive members therebetween. Braking system 112 includes a brake sensor 162 which, in one example, monitors when braking system 112 is applied. In one example, brake sensor 162 monitors when a driver actuatable brake input, such as brake pedal 262 (see FIG. 9) in vehicle 200, is applied. In one embodiment, braking system 112 includes anti-lock brakes. In one embodiment, braking system 112 includes active descent control and/or engine braking. In one embodiment, braking system 112 includes a brake and in some embodiments a separate parking brake.

Referring to FIGS. 3-9. An exemplary vehicle 100, a side-by-side vehicle 200, is illustrated. Additional details regarding vehicle 200 are provided in US Published Patent Application No. US 2015-0259011 A1, filed Apr. 9, 2015, the entire disclosure of which is expressly incorporated by reference herein.

Vehicle 200 generally comprises a frame 202 (FIG. 5) supported by a plurality of ground engaging members 204. As shown in this disclosure, ground engaging members 204 are wheels and tires. Vehicle 10 further comprises a drive train 206 (FIG. 5) supported by frame 202 and drivingly connected to one or more of the ground engaging members 204. In the present disclosure, the drivetrain 206 is comprised of a fuel-burning internal combustion engine and transmission combination, together with at least one driveshaft extending between drivetrain 206 and both of the ground engaging members 204 of a front set 208 of ground engaging members and a rear set 210 of ground engaging members 204.

Figure 8:
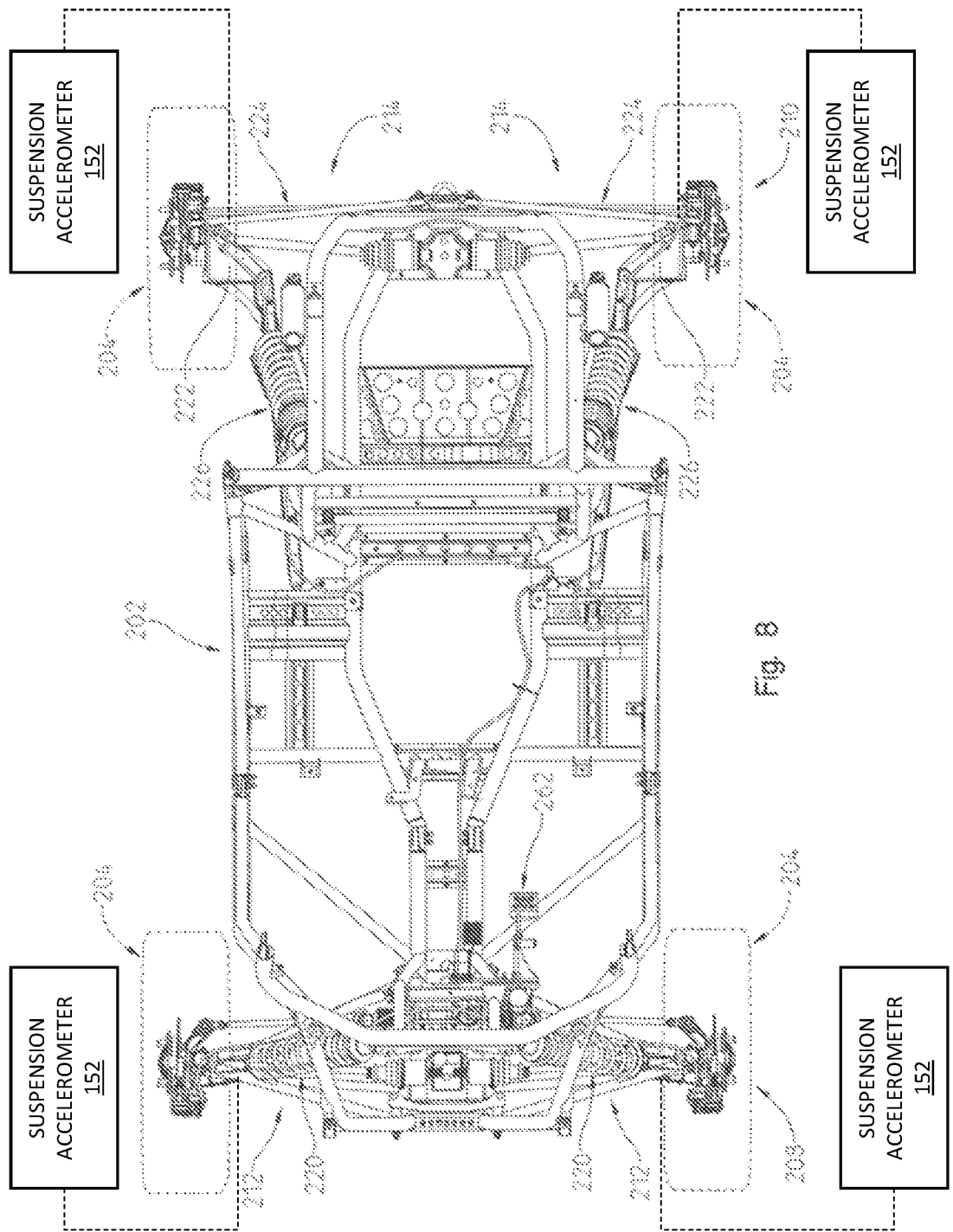
FIG. 8 illustrates a top view of the vehicle frame and suspensions of the vehicle of FIG. 3.

Referring to FIG. 8, each of ground engaging members 204 of front set 208 are coupled to frame 202 through respective front suspensions 212 and each of ground engaging members 204 of rear set 208 are coupled to frame 202 through respective rear suspensions 214. Front suspensions 212 are double control arm type suspensions, such as a double A-arm suspension, having an upper control arm 216 (see FIG. 7) and a lower control arm 218 (see FIG. 7). Front suspensions 212 each also include a shock absorber 220. Rear suspensions 214 are trailing arm type suspensions generally comprised of rear trailing arms 222 and control arms 224. Rear suspensions 214 each also include a shock absorber 226. In one embodiment, each of front shock absorbers 220 and rear shock absorbers 226 are adjustable shock absorbers 110. Additional details regarding exemplary drivetrains, front suspensions, and rear suspensions are provided in U.S. Pat. Nos. 8,827,028, 7,819,220, 8,746,719, and US Published Patent Application No. US 2015-0259011 A1, the entire disclosures of which are expressly incorporated by reference herein.

As shown in FIGS. 3-7, vehicle 200 further includes a body portion or chassis shown generally at 230 to include a hood 232, front fender 234, dash 236, sideboard 238, front floorboard 240, rear sideboard 242 and rear cargo area 244. As also shown, vehicle 200 is comprised of operator or seating area 250, having a driver seat 252 and a passenger seat 254. As shown best in FIG. 5, driver seat 252 includes a seat back 256 and a seat bottom 258.

Figure 9:
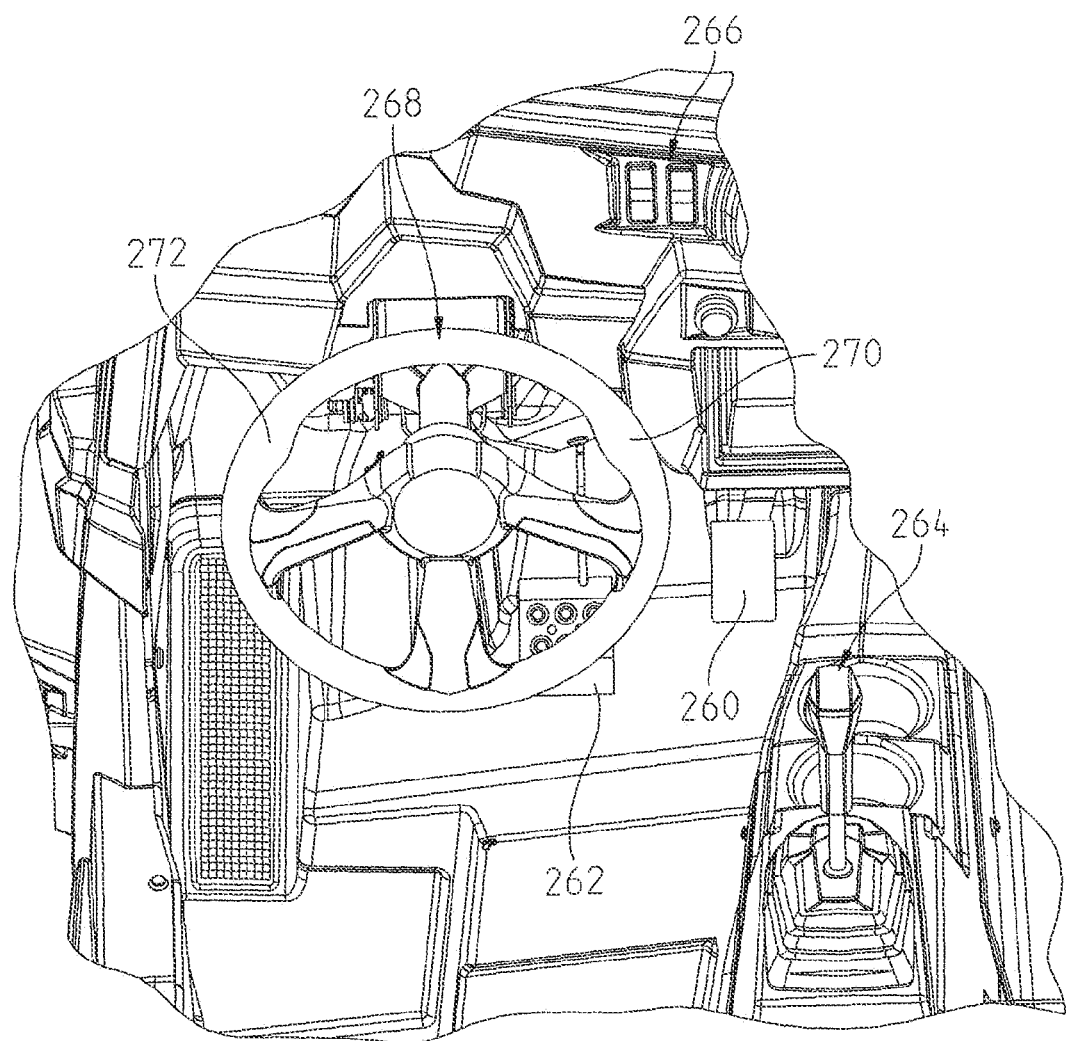
FIG. 9 illustrates a partial rear view of the operator space of the vehicle of FIG. 3 illustrating a foot actuated accelerator pedal and a foot actuated brake pedal.

Referring to FIG. 9, vehicle 200 further includes a plurality of operator controls including a foot actuated accelerator pedal 260, a foot actuated brake pedal 262, a transmission gear selector 264, a plurality of dash supported switches 266, and a steering wheel 268. Steering wheel 268 is gripped by the hands of the driver generally in areas 270 and 272 and is rotated to alter a steering direction of vehicle 200. Accelerator pedal 260 is operatively coupled to power system 116 and is depressed by the foot of the driver to increase a driving speed of vehicle 200. Brake pedal 262 is operatively coupled to braking system 112 and a pedal face of brake pedal 262 is depressed by the foot of the driver to decrease a driving speed of vehicle 200. Transmission gear selector 264 is operatively coupled to shiftable transmission 140 and is moveable by a hand of the driver to select a gear of shiftable transmission 140. Dash supported switches 266 may be used to specify a ride mode of vehicle 200. Based on the state of switches 266, controller 120 configures suspension system 102 to have the selected ride mode damping profile.

Returning to FIG. 1, controller 120 receives user inputs from operator interface 122 and adjusts the damping characteristics of adjustable shock absorbers 110 accordingly. The operator may independently adjust front and rear adjustable shock absorbers 110 to adjust the ride characteristics of vehicle 100. In certain embodiments, each of adjustable shock absorbers 110 is independently adjustable so that the damping characteristics of adjustable shock absorbers 110 are changed from one side of the vehicle to another and/or from the front of vehicle 100 to the back of vehicle 100. Side-to-side adjustment is desirable during sharp turns or other maneuvers in which different damping profiles for adjustable shock absorbers 110 on opposite sides of the vehicle improves the handling characteristics of the vehicle. Front-to-back adjustment is desirable during braking or other conditions. The damping response of adjustable shock absorbers 110 can be changed in a matter of milliseconds to provide nearly instantaneous changes in damping for potholes, dips in the road, or other driving conditions.

In one embodiment, controller 120 is operatively coupled to a plurality of vehicle condition sensors 160 and alters a damping characteristic of one or more adjustable shock absorbers 110 of suspension system 102 based at least in part on the received indications from the plurality of vehicle condition sensors 160. Vehicle condition sensors 160 may either actively provide an indication by sending a sensor signal or passively provide an indication by making available a monitored characteristic, such as a voltage, a temperature, a pressure or other suitable characteristics.

Exemplary vehicle condition sensors include a global change accelerometer 152 is coupled to each suspension adjacent each ground engaging member 104. Each accelerometer 152 provides an output signal to controller 120. Accelerometers 152 provide an output signal indicating movement of the ground engaging members 104 and suspension components 108 and 110 as vehicle 100 traverses different terrain. Additional vehicle condition sensors 160 may include a vehicle speed sensor 154, a steering sensor 156, a chassis supported accelerometer 158, a chassis supported gyroscope 161, and other sensors which monitor one or more characteristics of vehicle 100. Each of vehicle speed sensor 154, steering sensor 156, chassis supported accelerometer 158, chassis supported gyroscope 161 are operatively coupled to controller 120 and controller 120 receives input from each of vehicle speed sensor 154, steering sensor 156, chassis supported accelerometer 158, chassis supported gyroscope 161.

Vehicle speed sensor 154 provides an indication of a speed of vehicle 100. In one embodiment, vehicle speed sensor 154 monitors a rotation speed of a ground engaging member 104 or a shaft connecting a ground engaging member 104 to power system 116. Steering sensor 156 monitors an angle of rotation of a steering control or a rate that the angle of rotation is changing, such as the angle a steering wheel or handlebars, are rotated from a base position.

Vehicle accelerometer 158, in one embodiment, is a three-axis accelerometer supported on the chassis to provide an indication of acceleration forces of vehicle 100 during operation. In one embodiment, vehicle accelerometer 158 is located at or close to a center position of vehicle 100. Vehicle gyroscope 161, in one embodiment, is illustratively a three-axis gyroscope supported on the chassis to provide indications of inertial measurements of the vehicle during operation. In one embodiment, vehicle accelerometer 158 is not located at a center of gravity of vehicle 100 and the readings of vehicle gyroscope 161 are used by controller 120 to determine the acceleration values of vehicle 100 at the center of gravity of vehicle 100. In one embodiment, vehicle accelerometer 158 and vehicle gyroscope 161 are integrated into a suspension controller 196.

Additional vehicle condition sensors 160 include a brake sensor 162 which provides an indication of a position of brake pedal 262 or a brake pressure, a throttle position sensor 164 which provides an indication of a position of accelerator pedal 260, a wheel speed sensor 166, and a gear selection sensor 168 which provides an indication of a gear of shiftable transmission 140 selected with gear selector 264. Each of these vehicle condition sensors 160 are operatively coupled to controller 120 to provide an output signal coupled to controller 120.

Controller 120 has at least one associated memory 170 which stores control logic, damping profiles, and sensor readings. Controller 120 provides the electronic control of the various components of vehicle 100. Further, controller 120 is operatively coupled to the plurality of vehicle condition sensors 160 which monitor various parameters of vehicle 100 or the environment surrounding vehicle 100. Controller 120 performs certain operations to control one or more subsystems of other vehicle components. In certain embodiments, the controller 120 forms a portion of a processing subsystem including one or more computing devices having memory, processing, and communication hardware. Controller 120 may be a single device or a distributed device, and the functions of the controller 120 may be performed by hardware and/or as computer instructions on a non-transitory computer readable storage medium, such as memory 170.

As illustrated in the embodiment of FIG. 1, controller 120 is represented as including several controllers. These controllers may each be single devices or distributed devices or one or more of these controllers may together be part of a single device or distributed device. The functions of these controllers may be performed by hardware and/or as computer instructions on a non-transitory computer readable storage medium, such as memory 120.

In one embodiment, controller 120 includes at least two separate controllers which communicate over a network 172. In one embodiment, network 172 is a CAN network. Details regarding an exemplary CAN network are disclosed in U.S. patent application Ser. No. 11/218,163, filed Sep. 1, 2005, the disclosure of which is expressly incorporated by reference herein. Of course any suitable type of network or data bus may be used in place of the CAN network. In one embodiment, two wire serial communication is used for some connections.

Referring to FIG. 1, in the illustrated embodiment, controller 120 includes an operator interface controller 180 which controls communication with an operator through operator interface 122. A steering controller 182 controls the operation of steering system 114. In one example, steering system 114 includes a power steering system and steering controller 182 controls a level of assist provided by the power steering system. Exemplary sensors and electronic power steering units are provided in U.S. patent application Ser. No. 12/135,107, assigned to the assignee of the present application, titled VEHICLE, the disclosure of which is expressly incorporated by reference herein. A prime mover controller 184 controls the operation of prime mover 130. A transmission controller 186 controls the operation of transmission system 134.

A communications controller 194 controls operation of a communication system 192 which connects vehicle 100 to remote devices 500. Exemplary remote devices include other vehicles 100'; personal computing devices, such as cellphones or tablets; a centralized computer system maintaining one or more databases; and other types of devices remote from vehicle 100 or carried by riders of vehicle 100. In one embodiment, communication controller 194 of vehicle 100 communicates with paired devices over a wireless network. An exemplary wireless network is a radio frequency network utilizing a BLUETOOTH protocol. In this example, communication system 192 includes a radio frequency antenna. Communication controller 190 controls the pairing of devices to vehicle 100 and the communications between vehicle 100 and the remote device. In one embodiment, communication controller 190 of vehicle 100 communicates with remote devices over a cellular network. In this example, communication system 192 includes a cellular antenna and communication controller 190 receives and sends cellular messages from and to the cellular network. In one embodiment, communication controller 190 of vehicle 100 communicates with remote devices over a satellite network. In this example, communication system 188 includes a satellite antenna and communication controller 190 receives and sends messages from and to the satellite network. In one embodiment, vehicle 100 is able to communicate with other vehicles over a WIFI network. In one embodiment, vehicle 100 is able to communicate with other vehicles 100 over a Radio Frequency mesh network and communication controller 190 and communication system 188 are configured to enable communication over the mesh network. An exemplary vehicle communication system is disclosed in U.S. patent application Ser. No. 15/262,113, filed Sep. 12, 2016, titled VEHICLE TO VEHICLE COMMUNICATIONS DEVICE AND METHODS FOR RECREATIONAL VEHICLES, the entire disclosure of which is expressly incorporated by reference herein. Additional details regarding exemplary communication systems are provided in U.S. Patent Application Ser. No. 62/424,285, filed Nov. 18, 2016, the entire disclosures of which are expressly incorporated by reference herein, the entire disclosure of which is expressly incorporated by reference herein.

Suspension controller 196 controls adjustable portions of suspension system 102. Exemplary adjustable components include adjustable shock absorbers 110, adjustable springs 108, and/or configurable stabilizer bars. Additional details regarding adjustable shocks, adjustable springs, and configurable stabilizer bars is provided in U.S. Patent Application Ser. No. 62/424,285, filed Nov. 18, 2016, and U.S. patent application Ser. No. 15/377,640, filed Dec. 13, 2016, the entire disclosures of which are expressly incorporated by reference herein.

A vehicle controller 194 controls lights, loads, accessories, chassis level functions, and other vehicle functions. A ride height controller 198 controls the preload and operational height of vehicle 100. In one embodiment, ride height controller 198 controls springs 108 to adjust a ride height of vehicle 100, either directly or through suspension controller 196. In one example, ride height controller 198 provides more ground clearance in a comfort ride mode compared to a sport ride mode.

In one embodiment, controller 120 either includes or is operatively coupled over network 172 to a location determiner 199 which determines a current location of vehicle 100. An exemplary location determiner 199 is a GPS unit which determines the position of vehicle 100 based on interaction with a global satellite system.

Although controller 120 of vehicle 100 is illustrated as a distributed system including operator interface controller 180, steering controller 182, prime mover controller 184, transmission controller 186, communication system 188, communication controller 190, communications controller 194, suspension controller 196, ride height controller 198, and location determiner 199, in one embodiment the functionality of at least two or more of operator interface controller 180, steering controller 182, prime mover controller 184, transmission controller 186, communication system 188, communication controller 190, communications controller 194, suspension controller 196, ride height controller 198, and location determiner 199 are combined into a single controller.

Figure 10:
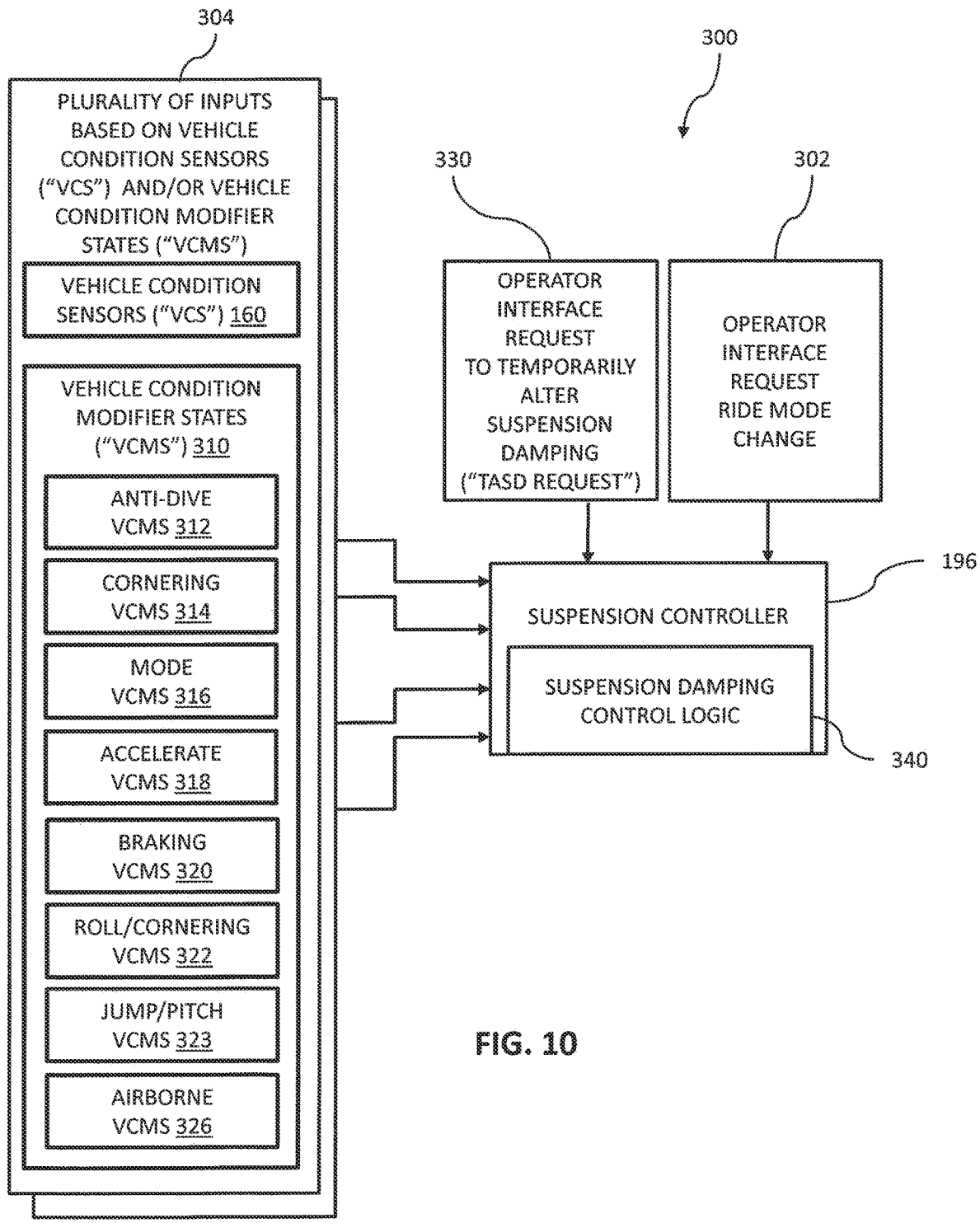
FIG. 10 illustrates an exemplary control system for the suspension of FIG. 3.

Referring to FIG. 10, an exemplary control system 300 for controlling the damping of adjustable shock absorbers 110 is provided. Suspension controller 196 is operatively coupled to adjustable shock absorbers 110 and controls the damping of adjustable shock absorbers 110 based on a plurality of inputs. Exemplary inputs are provided in FIG. 10 and throughout this disclosure. Further, additional exemplary inputs for suspension controller 196 and control processing sequences for suspension controller 196 are provided in U.S. Patent Application Ser. No. 62/424,285, filed Nov. 18, 2016, and U.S. patent application Ser. No. 15/377,640, filed Dec. 13, 2016, the entire disclosures of which are expressly incorporated by reference herein.

Returning to FIG. 10, suspension controller 196 receives a plurality of inputs that affect the damping profiles of shock absorbers 110. First, an operator of vehicle 100 may specify a desired ride mode for vehicle 100 as represented by block 302. In the illustrated embodiment, the operator specifies the desired ride mode through user interface 122, such as with dash supported switches 266 or an input device 274 supported by steering wheel 268 of vehicle 100. Exemplary input devices include at least one button, a rocker switch, or other suitable driver actuatable device. Exemplary ride modes may alter the damping profile of shock absorbers 110 and the characteristics of other systems of vehicle 100. Suspension controller 196 has stored damping profiles that correspond to each ride mode. Additional details regarding exemplary ride modes and driver inputs for specifying a desired ride mode are disclosed in U.S. Patent Application Ser. No. 62/424,285, filed Nov. 18, 2016, and U.S. patent application Ser. No. 15/377,640, filed Dec. 13, 2016, the entire disclosures of which are expressly incorporated by reference herein.

Exemplary ride modes include a comfort ride mode, a sport ride mode, and a firm ride mode, respectively. A comfort ride mode is generally optimized for comfort and performance. The suspension remains normally soft unless dynamic vehicle conditions sensed by more or more of vehicle condition sensors 160 demand a more firm setting. A sport ride mode increases the baseline damping of adjustable shock absorbers 110 compared to the comfort ride mode, more aggressively controls body roll for vehicle conditions such as turning or airborne, and has different speed sensitivity characteristics for increasing the damping of adjustable shock absorbers 110. A firm ride mode increases the baseline damping of adjustable shock absorbers 110 compared to sport mode. In one example, the firm ride mode provides a maximum damping characteristic of adjustable shock absorbers 110. Additional ride modes are disclosed in U.S. Patent Application Ser. No. 62/424,285, filed Nov. 18, 2016, and U.S. patent application Ser. No. 15/377,640, filed Dec. 13, 2016, the entire disclosures of which are expressly incorporated by reference herein.

Returning to FIG. 10, second, suspension controller 196 receives inputs from vehicle condition sensors 160, as represented by block 304. Based on the conditions sensed by vehicle condition sensors 160, suspension controller 196 may alter the damping characteristics of shock absorbers 110. For example, based on the conditions sensed by vehicle condition sensors 160, suspension controller 196 may determine that one or more vehicle condition modifier states ("VCMS") 310 exists which potentially results in altering the damping characteristics of shock absorbers 110. Exemplary vehicle condition modifier states 310 include an anti-dive VCMS 312, a cornering VCMS 314, a MODE VCMS 316, an acceleration VCMS 318, a braking VCMS 320, a roll/cornering VCMS 322, a jump/pitch VCMS 323, and an airborne VCMS 326. In anti-dive VCMS 312, suspension controller 196, in response to an indication of heavy braking from brake sensor 162, adjusts the damping levels of shock absorbers 110 adjacent the front axle to be firmer to reduce "dive" of the vehicle. Additional details regarding these and other VCMS are disclosed in U.S. Patent Application Ser. No. 62/424,285, filed Nov. 18, 2016, and U.S. patent application Ser. No. 15/377,640, filed Dec. 13, 2016, the entire disclosures of which are expressly incorporated by reference herein.

Third, suspension controller 196 receives an input from the operator to temporarily alter the suspension damping characteristic ("TASD Request"), as represented by block 330. In one example, the TASD Request is a request to temporarily increase a damping characteristic of one or more adjustable shocks. In another example, the TASD Request is a request to temporarily decrease a damping characteristic of one or more adjustable shocks. Based on inputs 302, 304, and 330, suspension controller 196 executes a suspension damping control logic 340 to determine a current damping value for each of shock absorbers 110 ("Current Determined Damping").

Figure 11:
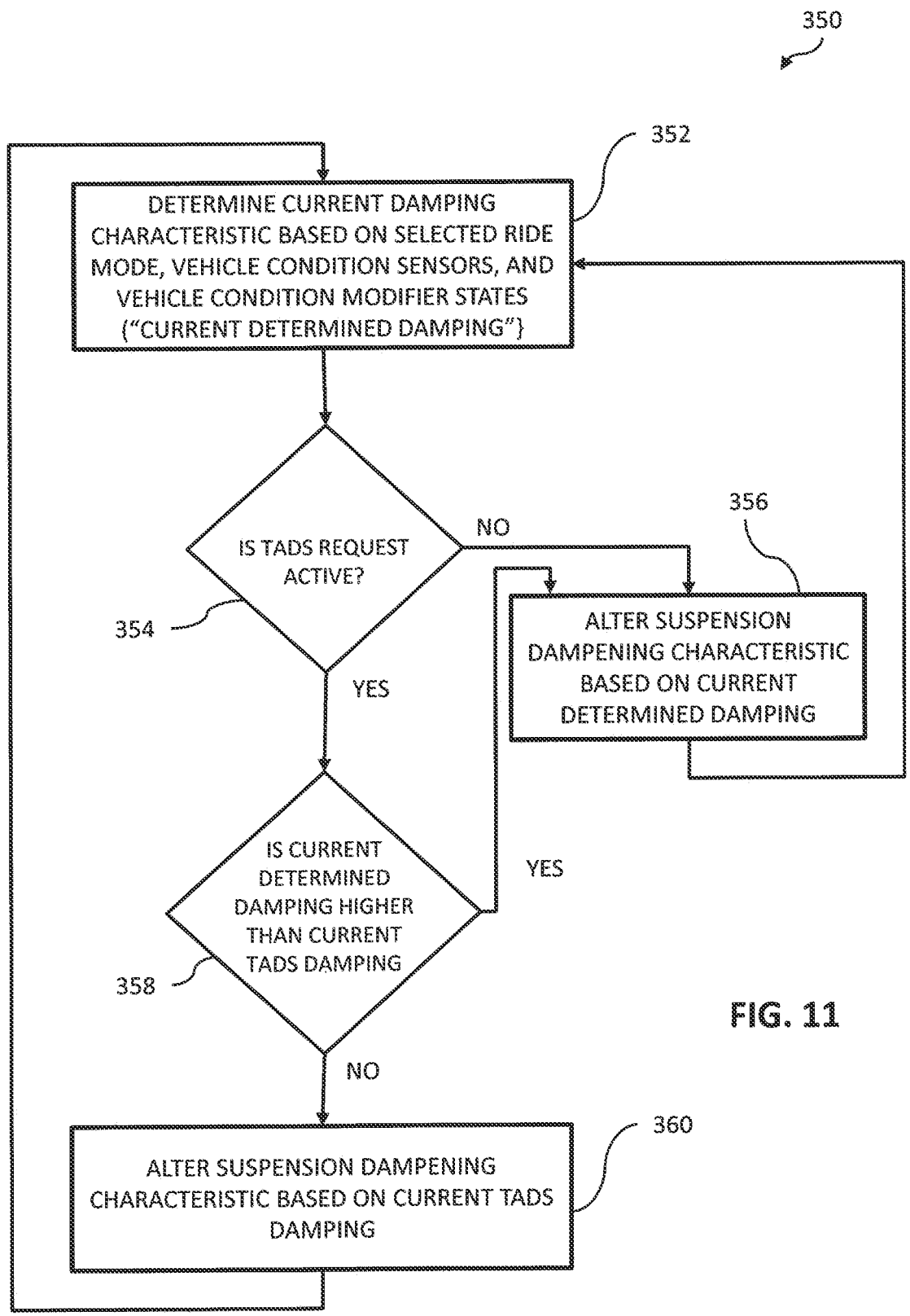
FIG. 11 illustrates an exemplary processing sequence of the vehicle of FIG. 3.

Referring to FIG. 11, an exemplary processing sequence 350 for suspension damping control logic 340 is illustrated. Suspension controller 196 determines the Current Determined Damping for each shock absorbers 110 based on inputs 302 and 304, as represented by block 352. Suspension controller 196 determines if a TASD Request is active, as represented by block 354. If a TASD Request is not active, suspension controller 196 alters the suspension damping characteristics of each shock absorbers 110 based on the Current Determined Damping, as represented by block 356.

If a TASD Request is active, suspension controller 196 determines which one of a damping characteristic of the TASD Request and the Current Determined Damping has a higher damping, as represented by block 358. If the Current Determined Damping is higher then suspension controller 196 alters the suspension damping characteristics of each shock absorber 110 based on the Current Determined Damping, as represented by block 356. If the TASD Request damping is higher then suspension controller 196 alters the suspension damping characteristics based on the TASD Request, as represented by block 360. In one embodiment, suspension controller 196 executes processing sequence 350 for each of shock absorbers 110 separately. In one embodiment, suspension controller 196 groups two or more shock absorbers 110 together and executes processing sequence 350 for the group. In one example, the TASD Request only affects a first subset of the plurality of adjustable shock absorbers. Thus, suspension controller 196 takes into account the TASD Request for the first subset of the plurality of adjustable shock absorbers 110 and not for the remainder of the plurality of adjustable shock absorbers 110.

An operator of vehicle 100 may specify a TASD Request through user interface 122. In one embodiment, an input device 276 supported by steering wheel 268 of vehicle 100. Exemplary input devices include at least one button, a rocker switch, a momentary switch, or other suitable driver actuatable device which may be actuatable by the driver in the absence of requiring the driver to remove either of hands of the driver from steering wheel 268. As such, a driver is able to continue to grip steering wheel 268 with both hands while still having the ability to submit a TASD Request. In another embodiment, input device 276 may be positioned proximate to steering wheel 268, but not be supported by steering wheel 268. For example, a lever or other input, similar to a turn signal input lever, windshield wiper input lever in a passenger car, or a paddle shifter input on the rear of a steering wheel, may be positioned directly behind steering wheel 268 and actuatable by the driver while the driver is able to continue to grip steering wheel 268. In implementations wherein vehicle 100 includes handlebars instead of a steering wheel, input device 276 may be positioned proximate to the grips of the handlebars. In another embodiment, input device 276 may be positioned on dash 236, a center console, or other locations within vehicle 200 which are accessible from driver seat 252.

Figure 5:
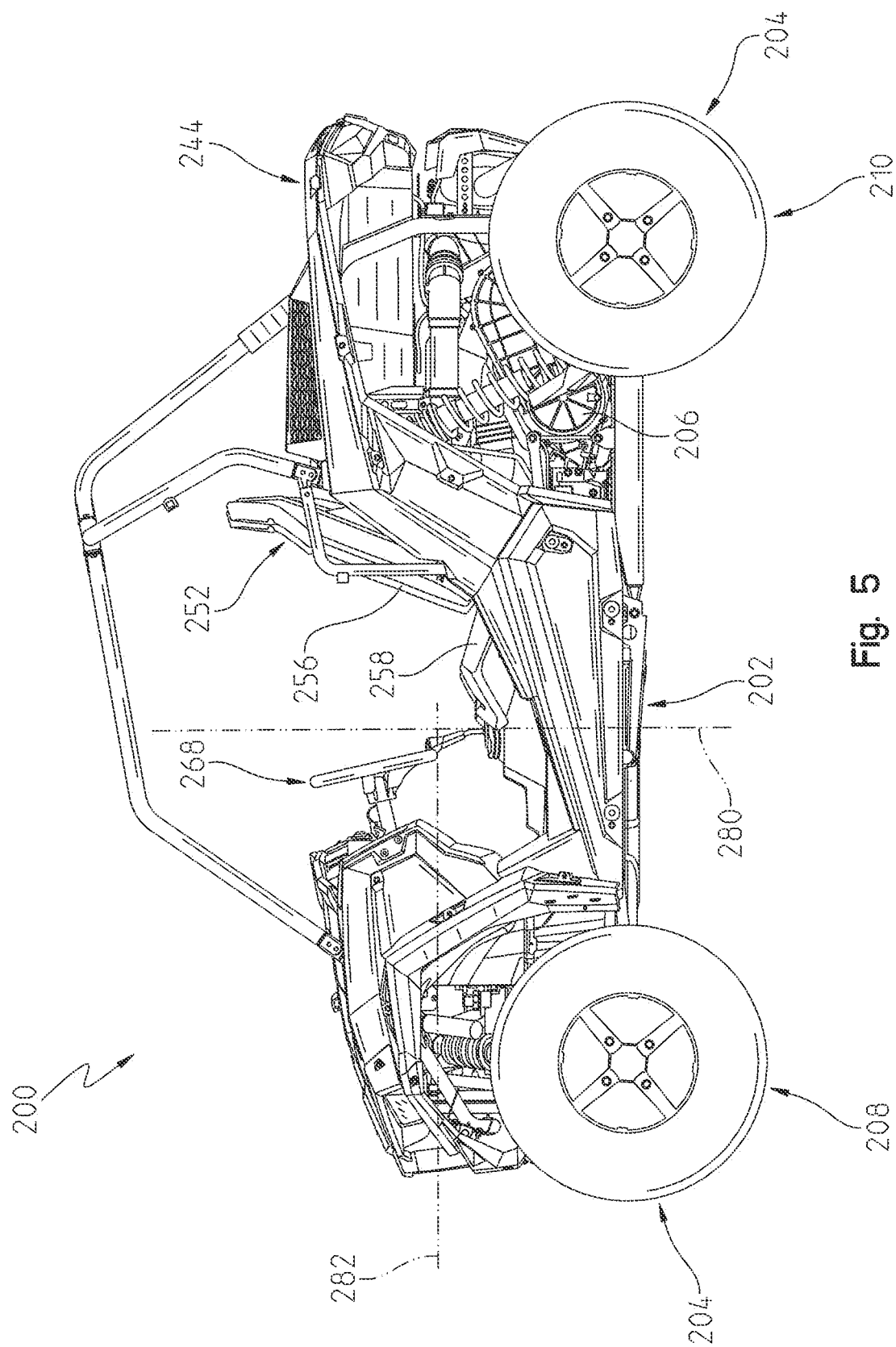
FIG. 5 illustrates a left side view of the vehicle of FIG. 3.
Figure 6:
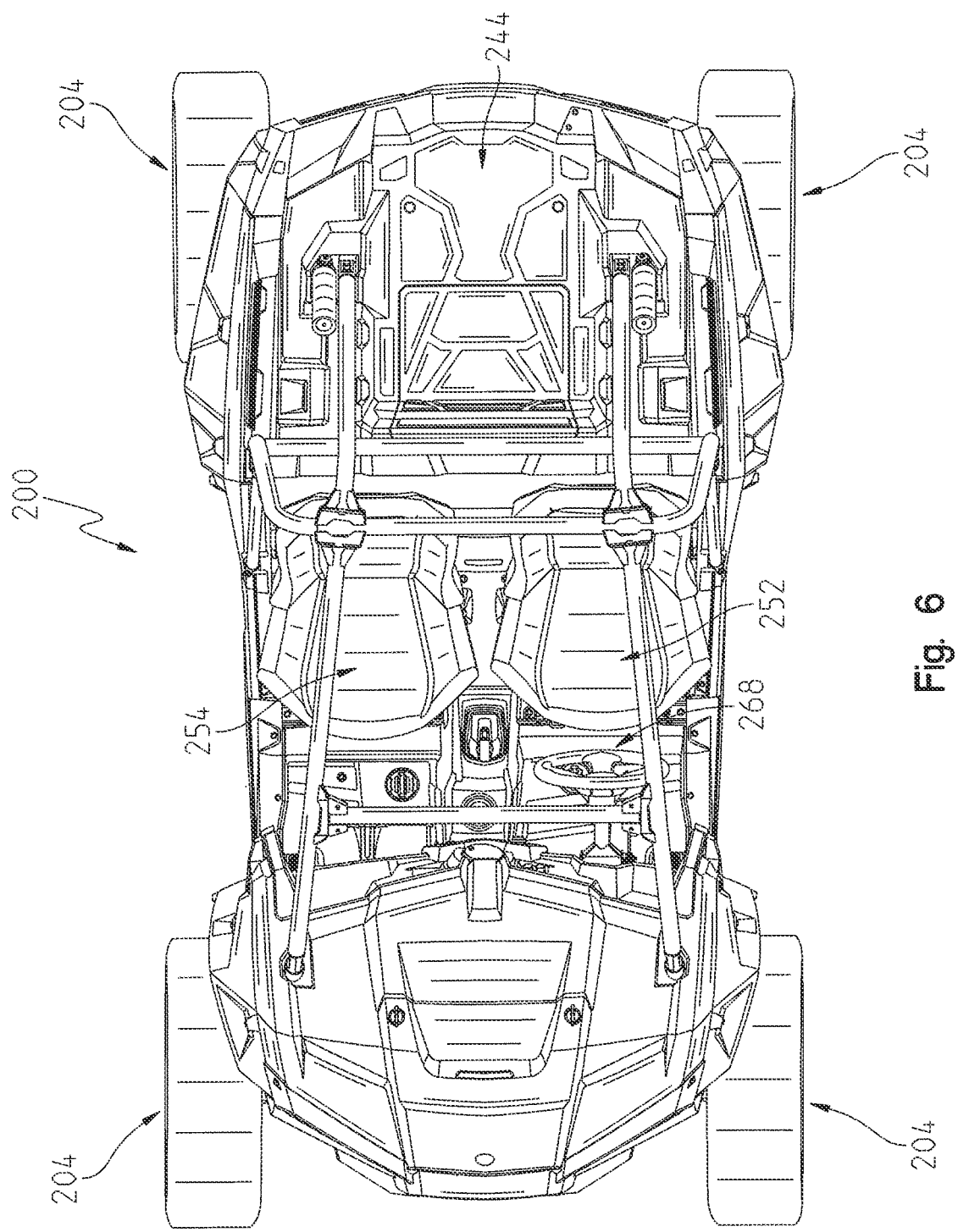
FIG. 6 illustrates a top view of the vehicle of FIG. 3.
Figure 7:
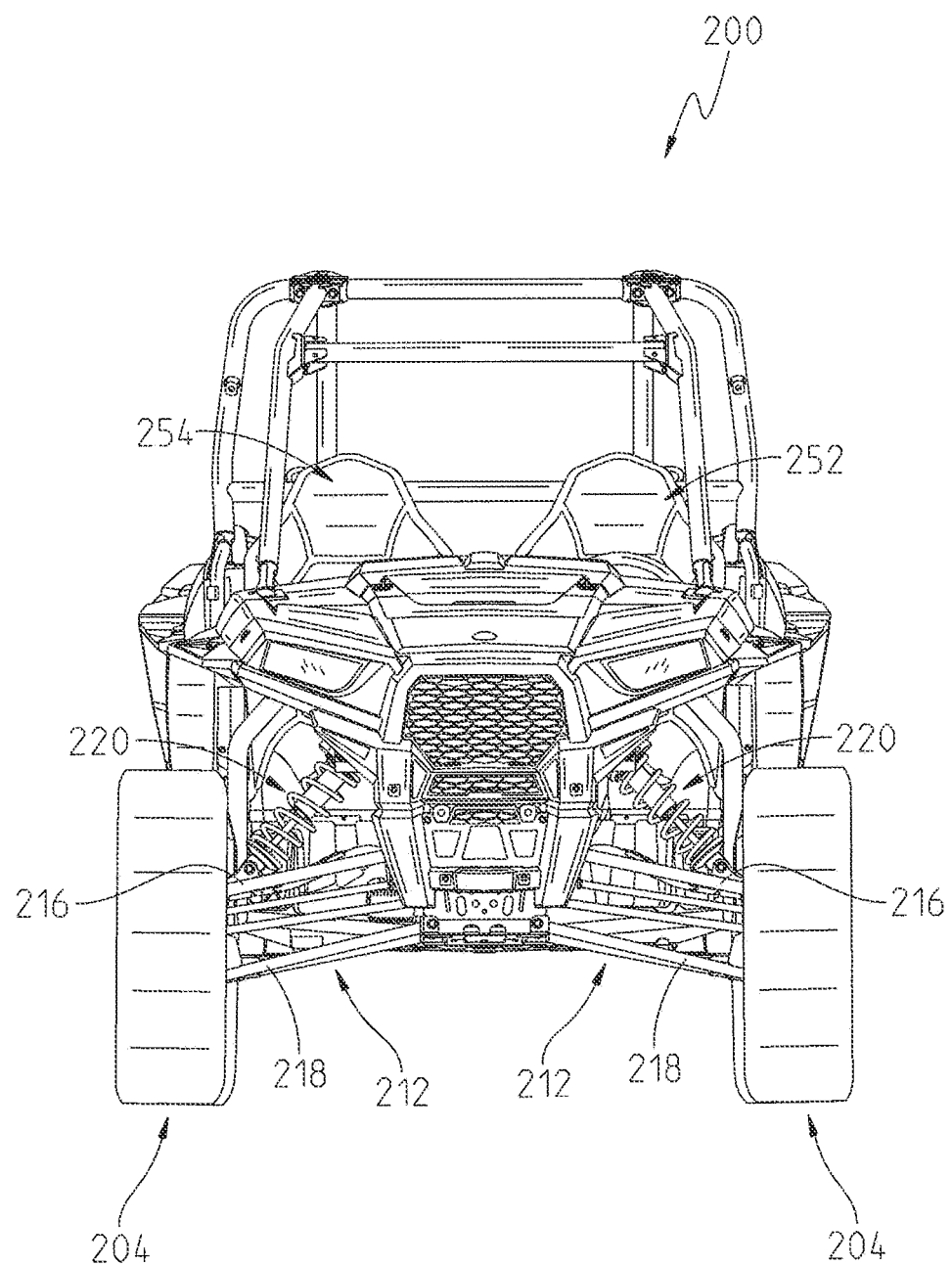
FIG. 7 illustrates a front view of the vehicle of FIG. 3.

In another embodiment, a TASD Request may be submitted through a driver actuatable input that is not actuatable by the hands of the driver. Referring to FIG. 5, in one embodiment, a driver actuatable input is positioned forward of a vertical plane 280 passing through a frontmost extent of driver seat 252 and lower than a horizontal plane 282 passing through a lowermost extent of steering wheel 268. The driver actuatable input may be positioned as a foot actuatable input positioned above floorboard 240. The driver actuatable input may have a driver engageable surface positioned lower than a seating surface of seat bottom 258 of driver seat 252. In one embodiment, the driver actuatable input is brake pedal 262. As an example, a driver may momentarily depress brake pedal 262 partway, commonly known as tapping the brakes, as a TASD Request to suspension controller 196 to increase a damping characteristic of one or more of adjustable shocks 110. The input through brake pedal 262 may be turned on/off through a rocker switch, a touch display. In one embodiment, a driver may provide a TASD Request through either input 276 or brake pedal 262.

Figure 9A:
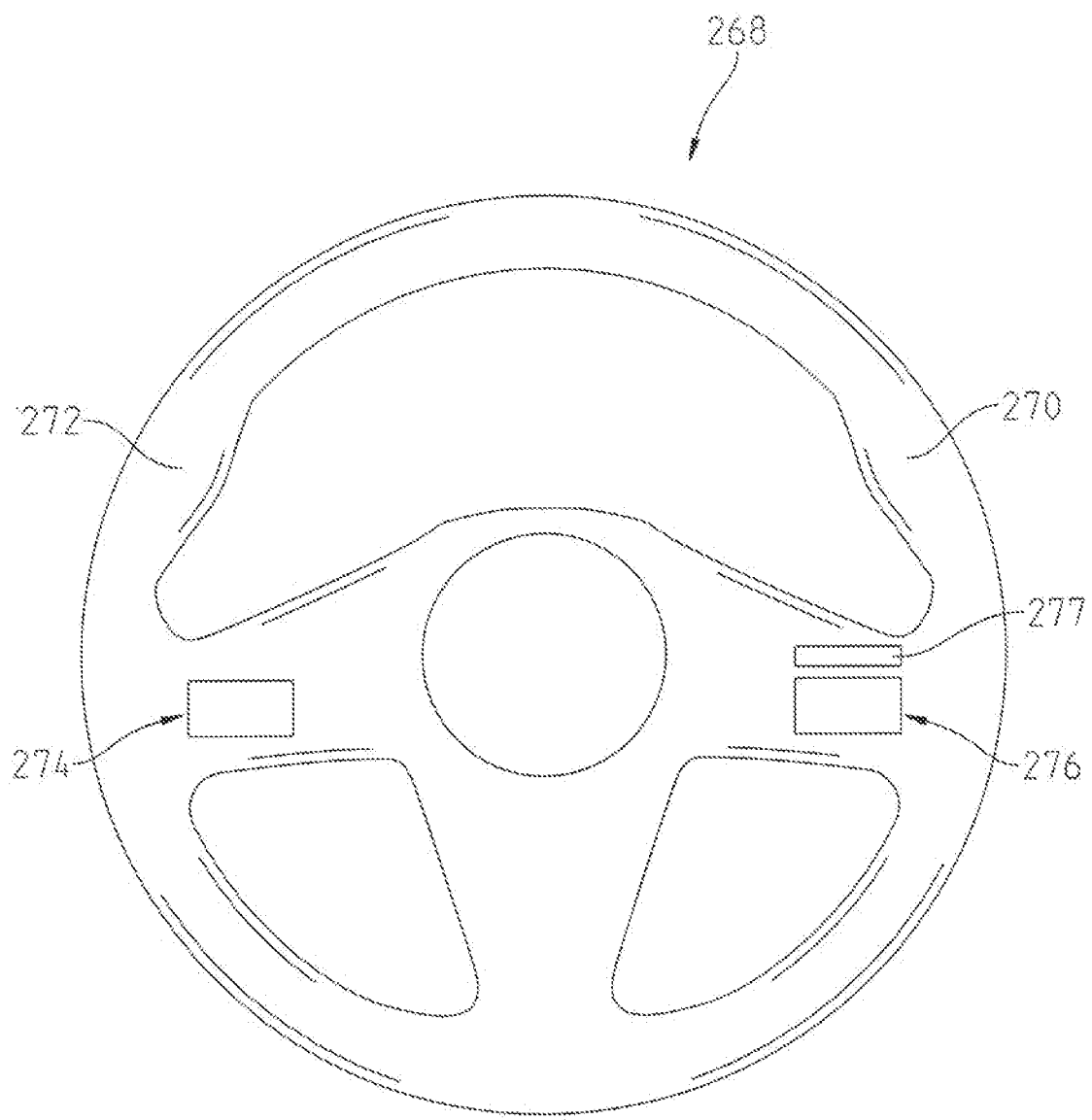
FIG. 9A illustrates an exemplary steering wheel of the vehicle of FIG. 3.

In one embodiment, a second driver actuatable input device 277 (see FIG. 9A) is provided. In this embodiment, first driver actuatable input device 276 provides a TASD Request to controller 196 to increase a stiffness of the at least one adjustable shock absorber and second driver actuatable input device 277 provides a TASD Request to controller 196 to reduce a stiffness of the at least one adjustable shock absorber.

The TASD Request may be submitted by actuation of input device 276 while vehicle 200 has a ground speed of greater than zero. The TASD Request may also be submitted while vehicle 200 is stationary.

In an exemplary processing sequence of the logic of suspension controller 196, suspension controller 196 controls the damping characteristic of an adjustable shock absorber 110 based on a plurality of inputs from vehicle condition sensors 160 supported by the vehicle 200 at a first time. Suspension controller 196 then receives at a second time subsequent to the first time a TASD Request to alter the damping characteristic of adjustable shock absorber 110 through input device 276 or brake pedal 262 which is actuatable by the driver in the absence of requiring a removal of either of the hands of the driver from the steering device, illustratively steering wheel 268. Suspension controller 196 then alters, at a third time subsequent to the second time, the damping characteristic of the adjustable shock absorber 110 based on the received TASD Request. Suspension controller 196 then automatically alters, at a fourth time subsequent to the third time, the damping characteristic of adjustable shock absorber 110 based on the plurality of inputs from vehicle condition sensors 160. In one example, suspension controller 196 carries out this processing sequence while vehicle 200 maintains a ground speed of greater than zero from the first time through the fourth time. In a further example, the damping characteristic at the fourth time is based on the plurality of inputs from vehicle condition sensors 160 supported by vehicle 200 at the fourth time.

In one embodiment, when suspension controller 196 alters, at a third time subsequent to the second time, the damping characteristic of the adjustable shock absorber 110 based on the received TASD Request, suspension controller 196 deviates a stiffness of the damping characteristic of shock absorbers 110 relative to the stiffness of the damping characteristic of shock absorbers 110 at the first time and at a fifth time between the third time and the fourth time alters the stiffness of the damping characteristic of shock absorbers 110 towards a current determined damping characteristic of shock absorbers 110 based on the plurality of inputs from vehicle condition sensors 160. In one example, the stiffness of the damping characteristic of shock absorbers 110 is deviated by increasing the stiffness of the damping characteristic of shock absorbers 110 and at the fifth time the alteration of the stiffness of the damping characteristic of shock absorbers 110 is a reduction of the stiffness of the damping characteristic of shock absorbers 110. In another example, the stiffness of the damping characteristic of shock absorbers 110 is deviated by decreasing the stiffness of the damping characteristic of shock absorbers 110 and at the fifth time the alteration of the stiffness of the damping characteristic of shock absorbers 110 is an increase of the stiffness of the damping characteristic of shock absorbers 110. In yet another example, the stiffness of the damping characteristic of shock absorbers 110 is held at a deviated level between the third time and the fifth time. In another example, the stiffness of the damping characteristic of shock absorbers 110 is held at a deviated level between the third time and the fifth time and the step of altering the stiffness of the damping characteristic of shock absorbers 110 at the fifth time includes the step of linearly altering, for example reducing or increasing, the stiffness of the damping characteristic of shock absorbers 110 from the deviated level to the current determined damping characteristic of shock absorbers 110 based on the plurality of inputs from vehicle condition sensors 160. In another example, the step of altering the stiffness of the damping characteristic of shock absorbers 110 at the fifth time includes the step of linearly altering, for example reducing or increasing, the stiffness of the damping characteristic of shock absorbers 110 to the current determined damping characteristic of shock absorbers 110 based on the plurality of inputs from vehicle condition sensors 160.

In one embodiment, when suspension controller 196 alters, at a third time subsequent to the second time, the damping characteristic of the adjustable shock absorber 110 based on the received TASD Request, suspension controller 196 deviates a stiffness of the damping characteristic of shock absorbers 110 relative to the stiffness of the damping characteristic of shock absorbers 110 at the first time and at a fifth time between the third time and the fourth time, alters, for example reduces or increases, the stiffness of the damping characteristic of shock absorbers 110, wherein the fifth time is a predetermined time delay period from the third time. In one example, the step of altering the stiffness of the damping characteristic of shock absorbers 110 includes reducing the stiffness of the damping characteristic of shock absorbers 110 towards a current determined damping characteristic of shock absorbers 110 based on the plurality of inputs from vehicle condition sensors 160. In another example, the TASD Request corresponds to an actuation of input device 276 or brake pedal 262 from a first configuration to a second configuration and suspension controller 196 initiates the predetermined time delay period upon the actuation of input device 276 or brake pedal 262 to the second configuration. In yet another example, the TASD Request corresponds to an actuation of input device 276 or brake pedal 262 from a first configuration to a second configuration and suspension controller 196 initiates the predetermined time delay period upon a detection of input device 276 or brake pedal 262 returning towards the first configuration. In still another example, the TASD Request corresponds to an actuation of input device 276 or brake pedal 262 from a first configuration to a second configuration and suspension controller 196 initiates the predetermined time delay period upon one of the actuation of input device 276 or brake pedal 262 to the second configuration and a detection of input device 276 or brake pedal 262 returning towards the first configuration, receives at a sixth time subsequent to the third time and prior to the fifth time, a second driver initiated request to alter the damping characteristic of shock absorbers 110 through input device 276 or brake pedal 262 which is actuatable by the driver in the absence of requiring a removal of either of the hands of the driver from the steering device, and delays the fifth time by resetting the predetermined time delay based on the second driver initiated request. In yet still a further example, the TASD Request is received by detecting a tapping of the brake pedal.

In one embodiment, suspension controller 196 alters the damping characteristics of each of shock absorber 220 in response to a received input from input device 276. In one example, the damping characteristics of each of shock absorber 220 are altered to the same damping setting. In another example, the damping characteristics of each of shock absorber 220 are altered to different damping settings. In another embodiment, suspension controller 196 alters the damping characteristics of each of shock absorbers 226 in response to a received input from input device 276. In one example, the damping characteristics of each of shock absorbers 226 are altered to the same damping setting. In another example, the damping characteristics of each of shock absorbers 226 are altered to different damping settings. In yet another embodiment, suspension controller 196 alters the damping characteristics of each of shock absorber 220 and shock absorbers 226 in response to a received TASD Request from input device 276. In one example, the damping characteristics of each of shock absorbers 220 and shock absorbers 226 are altered to the same damping setting. In another example, the damping characteristics of each of shock absorbers 220 and shock absorbers 226 are altered to different damping settings.

Figure 12A:
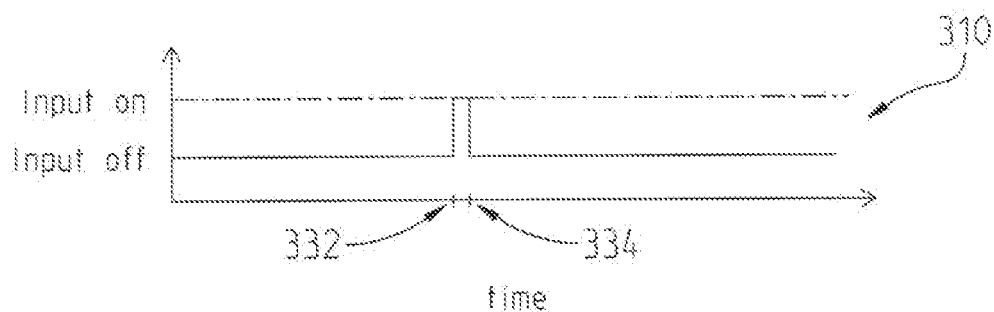
FIG. 12A illustrates an exemplary timing diagram for a driver actuatable input of the vehicle of FIG. 3.
Figure 12B:
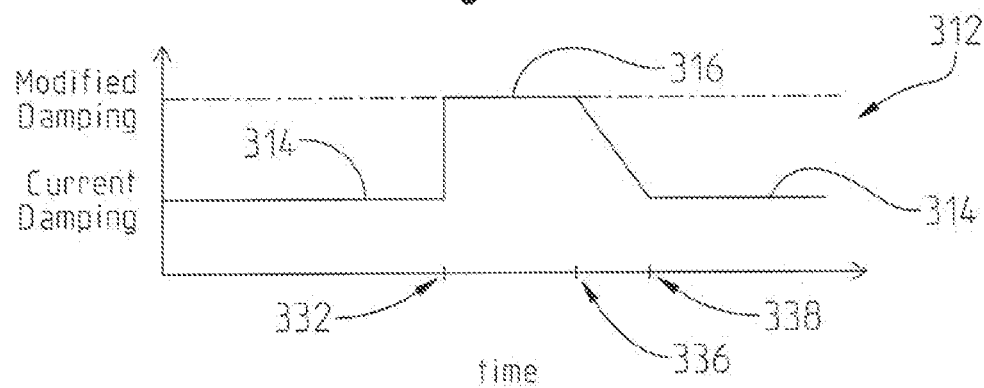
FIG. 12B illustrates an exemplary timing diagram for a damping level of an adjustable shock absorber of the vehicle of FIG. 3.

Referring to FIGS. 12A and 12B, an exemplary damping characteristic modification based on a TASD Request is illustrated. FIG. 12A illustrates a timing diagram for the actuation of input device 276, but is also applicable to the actuation of brake pedal 262. Curve 310 represents the actuation of input device 276 wherein at time 332 input device 276 is depressed and at time 334 input device 276 is released. Curve 312 illustrates an exemplary damping profile for shock absorbers 110 for the same time span. At time 332, the stiffness of shock absorbers 110 is increased from a pre time 332 level 314 to a deviated level 316. The stiffness is held at deviated level 316 from time 332 to time 336 and then decays back to level 314 at time 338. In the illustrated example, deviated level 316 corresponds to a constant stiffness level, but the deviated level may have other profiles including at least a portion of the deviated level having an increasing slope, at least a portion of the deviated level having a decreasing slope, at least a portion of deviated level having a non-linear profile, and/or other suitable profiles. In the illustrated example, the deviated level 316 corresponds to an increase in the stiffness of the shock absorbers 110, but the deviated level may alternatively correspond to a decrease in the stiffness of the shock absorbers 110 relative to level 314. In the illustrated example, at both pre time 332 and post time 338 suspension controller 196 based on inputs 302 and 304 determines the appropriate damping levels. In the illustrated example, the levels are the same, but may differ in some examples. In the illustrated example, the decay of the stiffness of shock absorbers 110 is linear from e 336 to time 338, but may take on different profiles including non-linear profiles. The time period between time 332 and time 336 is a predetermined time period set by suspension controller 196 for holding shock absorbers 110 at stiffness level 316.

Figure 13A:
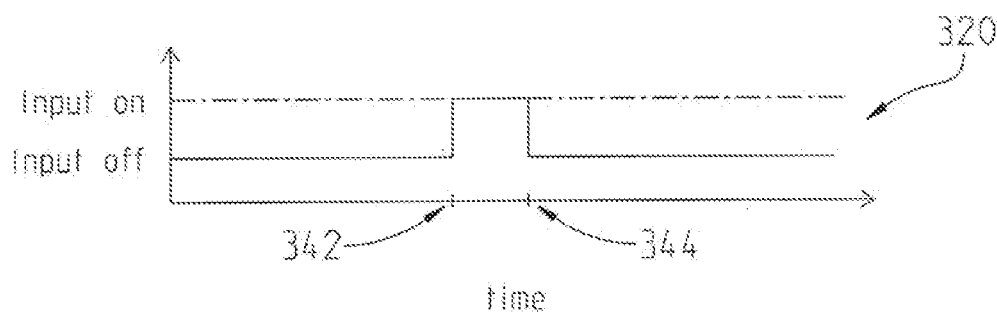
FIG. 13A illustrates another exemplary timing diagram for a driver actuatable input of the vehicle of FIG. 3.
Figure 13B:
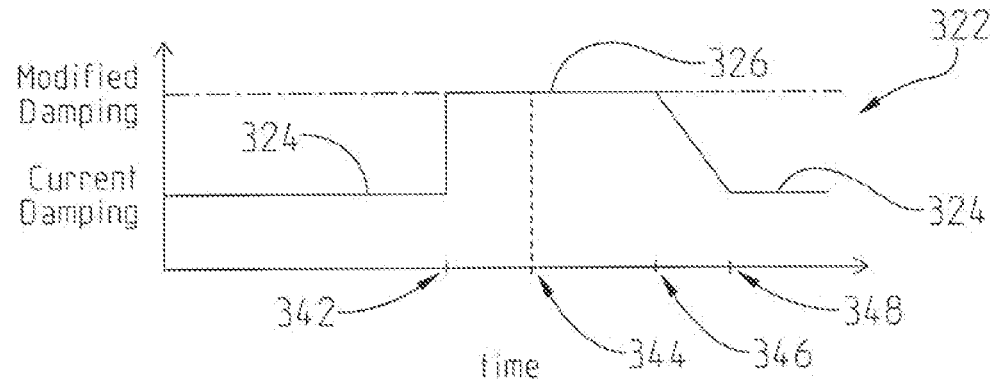
FIG. 13B illustrates another exemplary timing diagram for a damping level of an adjustable shock absorber of the vehicle of FIG. 3.

Referring to FIGS. 13A and 13B, an exemplary damping characteristic modification based on a TASD Request is illustrated. FIG. 13A illustrates a timing diagram for the actuation of input device 276, but is also applicable to the actuation of brake pedal 262. Curve 320 represents the actuation of input device 276, wherein at time 342 input device 276 is depressed and at time 344 input device 276 is released. FIG. 13A illustrates a longer hold of input device 276 in the depressed configuration compared to curve 310 of FIG. 12A. Curve 322 illustrates an exemplary damping profile for shock absorbers 110 for the same time span. At time 342, the stiffness of shock absorbers 110 is deviated from a pre time 342 level 324 to a level 326. The stiffness is held at deviated level 326 from time 342 to time 346 and then decays back to level 324 at time 348. In the illustrated example, deviated level 326 corresponds to a constant stiffness level, but the deviated level may have other profiles including at least a portion of the deviated level having an increasing slope, at least a portion of the deviated level having a decreasing slope, at least a portion of deviated level having a non-linear profile, and/or other other suitable profiles. In the illustrated example, the deviated level 326 corresponds to an increase in the stiffness of the shock absorbers 110, but the deviated level may alternatively correspond to a decrease in the stiffness of the shock absorbers 110 relative to level 324. In the illustrated example, at both pre time 342 and post time 348 suspension controller 196, based on inputs 302 and 304, determines the appropriate damping levels. In the illustrated example, the levels are the same, but may differ in some examples. In the illustrated example, the decay of the stiffness of shock absorbers 110 is linear from time 346 to time 348, but may take on different profiles including non-linear profiles. The time period between time 344 and time 346 is a predetermined time period set by suspension controller 196 for holding shock absorbers 110 at stiffness level 306. In FIG. 13B, the predetermined time period does not start until input device 276 is released at time 344.

Figure 14A:
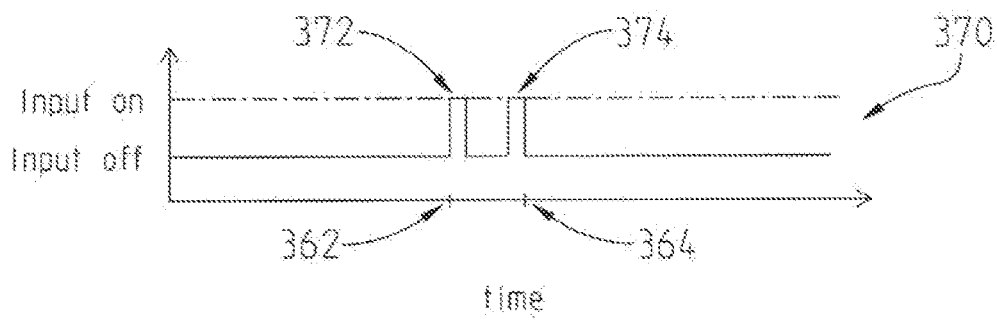
FIG. 14A illustrates a further exemplary timing diagram for a driver actuatable input of the vehicle of FIG. 3.
Figure 14B:
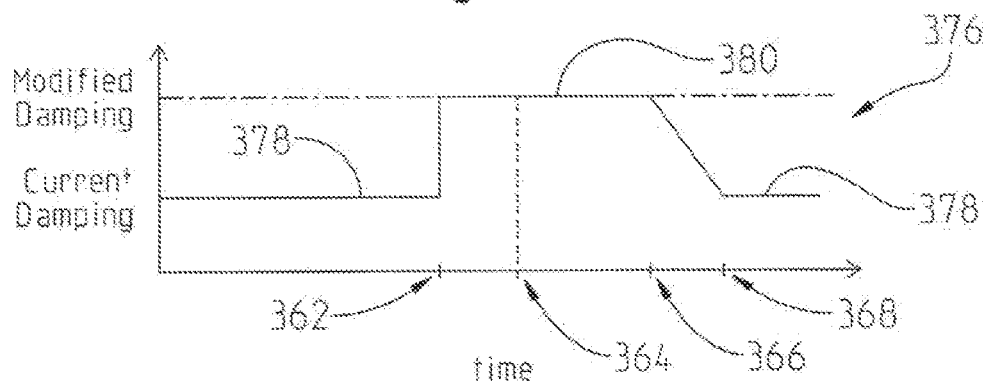
FIG. 14B illustrates a further exemplary timing diagram for a damping level of an adjustable shock absorber of the vehicle of FIG. 3.

Referring to FIGS. 14A and 14B, an exemplary damping characteristic modification based on a TASD Request is illustrated. FIG. 14A illustrates a timing diagram for the actuation of input device 276, but is also applicable to the actuation of brake pedal 262. Curve 370 represents the actuation of input device 276 wherein input device 276 is depressed and released twice, a first actuation 372 and a second actuation 374. First actuation 372 begins at time 362 and second actuation 374 ends at time 364. Curve 376 illustrates an exemplary damping profile for shock absorbers 110 for the same time span. At time 362, the stiffness of shock absorbers 110 is deviated from a pre time 362 level 378 to a deviated level 380. The stiffness is held at level 380 from time 362 to time 366 and then decays back to level 378 at time 368. In the illustrated example, deviated level 380 corresponds to a constant stiffness level, but the deviated level may have other profiles including at least a portion of the deviated level having an increasing slope, at least a portion of the deviated level having a decreasing slope, at least a portion of deviated level having a non-linear profile, and/or other other suitable profiles. In the illustrated example, the deviated level 380 corresponds to an increase in the stiffness of the shock absorbers 110, but the deviated level may alternatively correspond to a decrease in the stiffness of the shock absorbers 110 relative to level 378. In the illustrated example, at both pre time 362 and post time 368, suspension controller 196, based on inputs 302 and 304, determines the appropriate damping levels. In the illustrated example, the levels are the same, but may differ in some examples. In the illustrated example, the decay of the stiffness of shock absorbers 110 is linear from time 366 to time 368, but may take on different profiles including non-linear profiles. Suspension controller 196 begins the predetermined time period for level 380 upon the release of input device 276 in first actuation 372. However, the subsequent second actuation 374 causes suspension controller 196 to reset the predetermined time period.

Figure 15A:
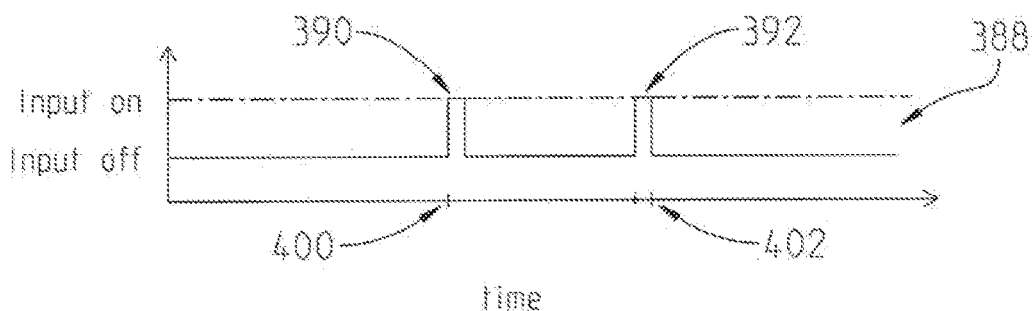
FIG. 15A illustrates yet a further exemplary timing diagram for a driver actuatable input of the vehicle of FIG. 3.
Figure 15B:
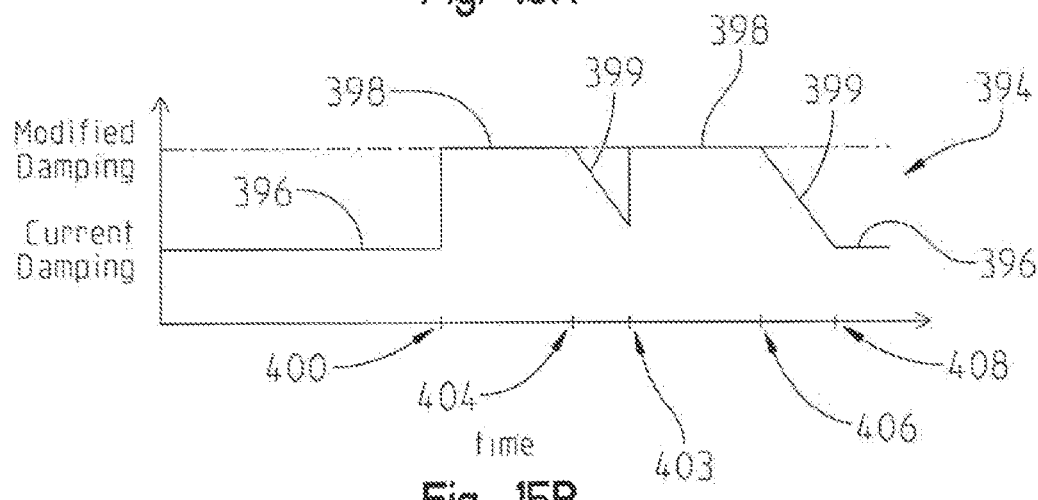
FIG. 15B illustrates yet a further exemplary timing diagram for a damping level of an adjustable shock absorber of the vehicle of FIG. 3.

Referring to FIGS. 15A and 15B, an exemplary damping characteristic modification based on a TASD Request is illustrated. FIG. 15A illustrates a timing diagram for the actuation of input device 276, but is also applicable to the actuation of brake pedal 262. Curve 388 represents the actuation of input device 276 wherein input device 276 is depressed and released twice, a first actuation 390 and a second actuation 392. Curve 388 is similar to curve 370 of FIG. 14A, except that the time period between the first actuation and the second actuation is increased. First actuation 372 begins at time 400 and second actuation 374 ends at time 402. Curve 376 illustrates an exemplary damping profile for shock absorbers 110 for the same time span. At time 400, the stiffness of shock absorbers 110 is deviated from a pre time 362 level 396 to a deviated level 398. The stiffness is held at deviated level 398 from time 400 to time 404 and then begins decaying back to level 396 at time 400. In the illustrated example, deviated level 398 corresponds to a constant stiffness level, but the deviated level may have other profiles including at least a portion of the deviated level having an increasing slope, at least a portion of the deviated level having a decreasing slope, at least a portion of deviated level having a non-linear profile, and/or other other suitable profiles. In the illustrated example, the deviated level 398 corresponds to an increase in the stiffness of the shock absorbers 110, but the deviated level may alternatively correspond to a decrease in the stiffness of the shock absorbers 110 relative to level 396. In the illustrated example, at both pre time 400 and post e 404, suspension controller 196, based on inputs 302 and 304, determines the appropriate damping levels. In the illustrated example, the decay of the stiffness of shock absorbers 110 is linear from time 404 to time 403, but may take on different profiles including non-linear profiles. Suspension controller 196 begins the predetermined time period for level 380 upon the release of input device 276 in first actuation 390. However, the subsequent second actuation 392 causes suspension controller 196 to reset the predetermined time period and to once again increase the stiffness of shock absorber 110 to level 398 at time 403. As shown in the illustrated embodiment, the increase to level 398 happens prior to the stiffness of shock absorber 110 returning to level 396. The stiffness of shock absorber 398 is held at level 398 until time 406 and then begins decaying back to level 396 between time 406 and time 408. In the illustrated example, the levels pre time 400 and post time 408 are the same, but may differ in some examples.

Figure 16A:
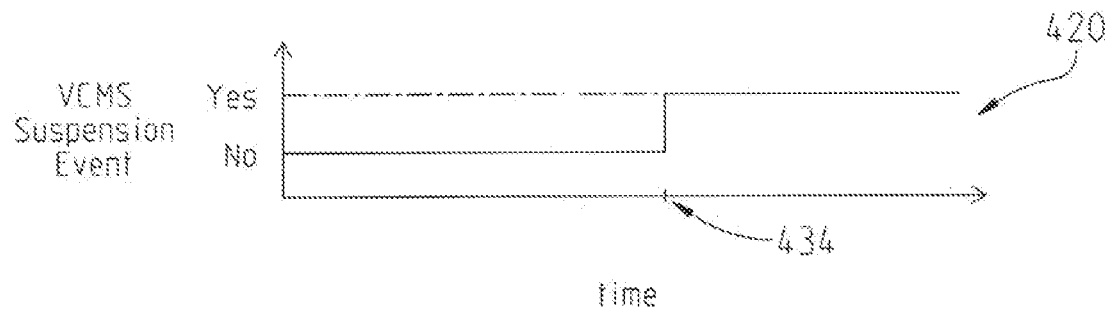
FIG. 16A illustrates an exemplary timing diagram of an occurrence of a vehicle condition modifier event for the suspension of the vehicle of FIG. 3.
Figure 16B:
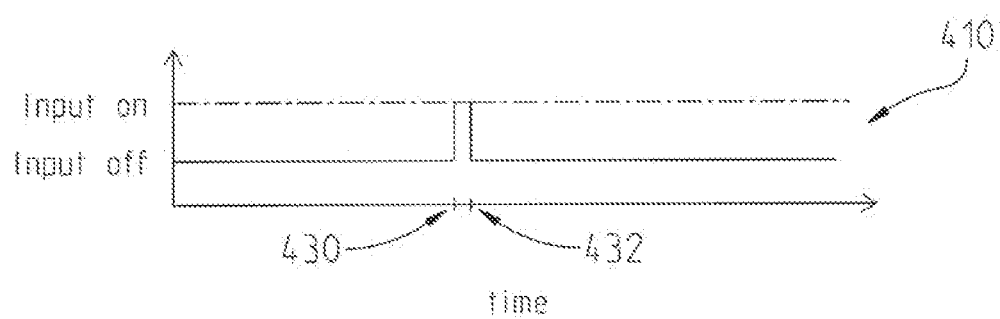
FIG. 16B illustrates still a further exemplary timing diagram for a driver actuatable input of the vehicle of FIG. 3.
Figure 16C:
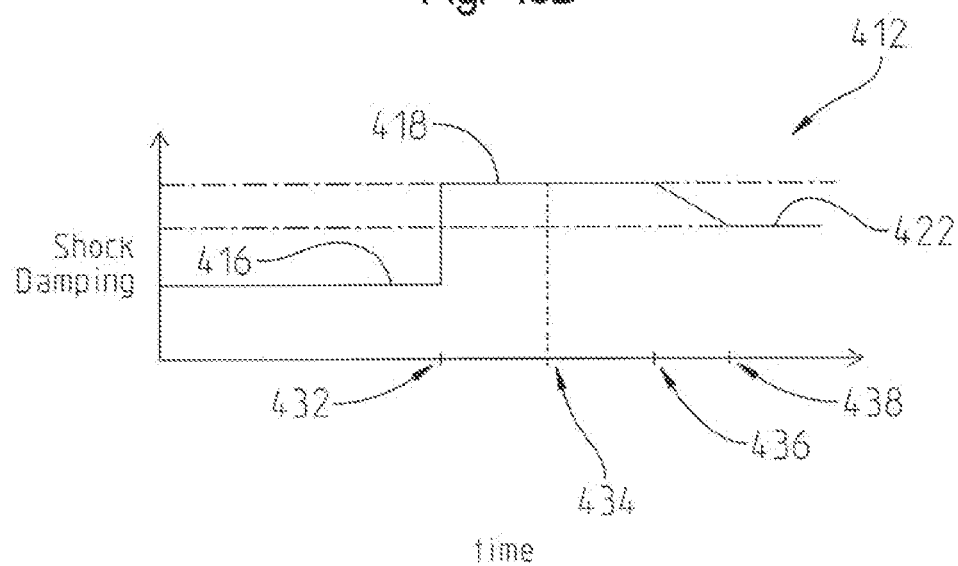
FIG. 16C illustrates still a further exemplary timing diagram for a damping level of an adjustable shock absorber of the vehicle of FIG. 3.

Referring to FIGS. 16A-16C, an exemplary damping characteristic modification based on a TAS(Request is illustrated. FIG. 16B illustrates a timing diagram for the actuation of brake pedal 262, but is also applicable to the actuation of input device 276. Curve 410 represents the actuation of brake pedal 262 wherein brake pedal 262 is depressed and released within a short period of time from 430 to 432, such as 20 milliseconds. Such an actuation is commonly referred to tapping the brakes. In FIG. 16C, curve 412 illustrates an exemplary damping profile for shock absorbers 110 for the same time span. At time 432, the stiffness of shock absorbers 110 is deviated from a pre time 432 level 416 to a deviated level 418. The stiffness is held at deviated level 418 from time 432 to time 436 and then decays back towards level 416 beginning at time 436 due to the expiration of the predetermined time period set by suspension controller 196. In one example, deviated level 418 corresponds to the same level of the Braking VCMS. However, before the stiffness level returns to level 416, suspension controller 196 determines the occurrence of a VCMS suspension event at time 434, as shown in FIG. 16A by curve 420. The VCMS suspension event results in suspension controller 196 selecting a stiffness level of 422. However, the then current stiffness level at time 434 is higher than level 422, thus suspension controller 196 maintains the stiffness level at level 418. At time 438, suspension controller 196 decays the stiffness level from level 418 to level 422 due to the VCMS suspension event still being active as represented by curve 420. If suspension controller 196 had determined that the VCMS suspension event was concluded, suspension controller 196 would have decayed the stiffness level from level 418 back to level 416 assuming no other inputs 302 and 304 have altered the then current suspension stiffness level. In the illustrated example, the decay of the stiffness of shock absorbers 110 is linear from time 436 to time 438, but may take on different profiles including non-linear profiles.

While embodiments of the present disclosure have been described as having exemplary designs, the present invention may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this invention pertains.

The invention claimed is:

1. A method of adjusting vehicle shock absorbers of a vehicle comprising the steps of:
    operatively coupling a prime mover to a plurality of ground engaging members through a CVT;
    monitoring with an electric controller a plurality of inputs from a plurality of sensors including a first suspension sensor supported by a front suspension of the vehicle positioned forward of a driver seat of the vehicle and a second suspension sensor supported by a rear suspension of the vehicle positioned rearward of the front suspension; and
    determining a first damping characteristic of a first adjustable shock absorber of the front suspension of the vehicle, a second damping characteristic of a second adjustable shock absorber of the rear suspension of the vehicle based on the plurality of sensors, a third damping characteristic of a third adjustable shock absorber of the front suspension of the vehicle, and a fourth damping characteristic of a fourth adjustable shock absorber of the rear suspension of the vehicle, wherein:
    if a first input of the plurality of inputs has a first condition, all of the first, second, third, and fourth damping characteristics are altered to increase the firmness of all of the first second, third, and fourth adjustable shocks absorbers, and
    if the first input of the plurality of inputs has a second condition, all of the first, second, third, and fourth damping characteristics are altered based on at least one vehicle characteristic determined by at least one of the plurality of sensors.

2. The method of claim 1, wherein the plurality of sensors further comprises at least one of a vehicle speed sensor, a steering sensor, an accelerometer, a gyroscope, a brake sensor, a throttle position sensor, a wheel speed sensor, and a gear selection sensor.

3. The method of claim 1, wherein the first adjustable shock absorber is coupled between a vehicle frame and at least one ground engaging member through an A-arm linkage.

4. The method of claim 1, wherein the rear suspension of the vehicle is a trailing arm type suspension.

5. The method of claim 1, further comprising the steps of receiving by the electric controller a selected ride mode of the vehicle, and
altering at least one of the first and second damping characteristics based on the selected ride mode of the vehicle.

6. The method of claim 5, wherein the selected ride mode comprises at least one of a comfort ride mode, a sport ride mode, and a firm ride mode.

7. The method of claim 1, wherein at least one of the first and second damping characteristics are altered based on a damping profile stored in a memory associated with the electronic controller.

8. The method of claim 1, wherein the first suspension sensor supported by the front suspension provides acceleration information.

9. The method of claim 1, wherein the second suspension sensor supported by the rear suspension provides acceleration information.

10. The method of claim 1, wherein the first input is associated with an operator control.

11. The method of claim 1, wherein the first input is associated with a brake pedal.

12. The method of claim 1, wherein the first suspension sensor is a global change accelerometer.

13. The method of claim 1, wherein the second suspension sensor is a global change accelerometer.

14. A vehicle for operation by a driver, comprising:
a plurality of ground engaging members;
a frame supported by the plurality of ground engaging members;
a prime member supported by the plurality of ground engaging members;
a CVT operatively coupled to the prime mover and to at least one of the plurality of ground engaging members;
a plurality of suspensions supported by the plurality of ground engaging members, the plurality of suspensions including a front suspension positioned forward of a driver seat of the vehicle and having a first adjustable shock absorber and a third adjustable shock absorber and a rear suspension rearward of the front suspension and having a second adjustable shock absorber and a fourth adjustable shock absorber; and
an electronic controller which monitors a plurality of inputs from a plurality of sensors including a first suspension sensor supported by the front suspension of the vehicle and a second suspension sensor supported by the rear suspension of the vehicle and determines a first damping characteristic of the first adjustable shock absorber of the front suspension of the vehicle, a second damping characteristic of the second adjustable shock absorber of the rear suspension of the vehicle, a third damping characteristic of the third adjustable shock absorber of the front suspension of the vehicle, and a fourth damping characteristic of the fourth adjustable shock absorber of the rear suspension of the vehicle based on the plurality of sensors, wherein:
if a first input of the plurality of inputs has a first condition, all of the first, second, third, and fourth damping characteristics are altered to increase the firmness of all of the first, second, third, and fourth adjustable shocks absorbers, and
if the first input of the plurality of inputs has a second condition, all of the first, second, third, and fourth damping characteristics are altered based on at least one vehicle characteristic determined by at least one of the plurality of sensors.

15. The vehicle of claim 14, further comprising:
a steering system supported by the frame and including a steering device operatively coupled to at least one of the plurality of ground engaging members to steer the vehicle;
a driver actuatable device positioned to be actuatable by a driver, the driver actuatable device being a dual purpose device capable of receiving a first input indicative of a first driver initiated request type and a second input indicative of a second driver initiated request type, the first driver initiated request type being to alter the damping characteristic of the adjustable shock absorber; and
a driver seat supported by the frame and having a seating surface positioned rearward of the steering device.

16. The vehicle of claim 14, wherein the first suspension sensor is a global change accelerometer.

17. The vehicle of claim 14, wherein the second suspension sensor is a global change accelerometer.

* * * * *